US010678792B2

(12) United States Patent
Ziauddin et al.

(10) Patent No.: US 10,678,792 B2
(45) Date of Patent: Jun. 9, 2020

(54) PARALLEL EXECUTION OF QUERIES WITH A RECURSIVE CLAUSE

(71) Applicant: Oracle International Corporation, Redwood Shores, CA (US)

(72) Inventors: Mohamed Ziauddin, Pleasanton, CA (US); You Jung Kim, Palo Alto, CA (US); Yali Zhu, Foster City, CA (US); Andrew Witkowski, Foster City, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 15/268,528

(22) Filed: Sep. 16, 2016

(65) Prior Publication Data

US 2017/0116276 A1   Apr. 27, 2017

Related U.S. Application Data

(60) Provisional application No. 62/245,958, filed on Oct. 23, 2015.

(51) Int. Cl.
  *G06F 16/20* (2019.01)
  *G06F 16/2453* (2019.01)
  *G06F 16/2455* (2019.01)

(52) U.S. Cl.
  CPC .... *G06F 16/24547* (2019.01); *G06F 16/2454* (2019.01); *G06F 16/24532* (2019.01);
  (Continued)

(58) Field of Classification Search
  CPC ......... G06F 16/24532; G06F 16/24561; G06F 16/24539; G06F 16/2454; G06F 16/24547; G06F 16/24566
  (Continued)

(56) References Cited

U.S. PATENT DOCUMENTS

5,359,724 A    10/1994  Earle
5,367,677 A *  11/1994  Stanfill ............. G06F 17/30613
                                                    340/146.2
(Continued)

OTHER PUBLICATIONS

Louiqa Raschid et al., "A Parallel Processing Strategy for Evaluation Recursive Queries", dated Aug. 1986, 8 pages.
(Continued)

*Primary Examiner* — Vincent F Boccio
(74) *Attorney, Agent, or Firm* — Hickman Palermo Becker Bingham LLP

(57) ABSTRACT

Techniques are described herein for executing queries with a recursive clause using a plurality of processes that execute database operations in parallel. Each process of the plurality of processes either generate or are assigned a segment that is part of a temporary table. For each iteration of the recursive query, work granules are divided up and assigned to each of the plurality of processes. As each respective process produces a portion of a result set for a given iteration, that process appends said portion of the result set to the respective segment that the respective process manages. Each slave process then publishes, to one or more sources, a reference to the newly generated results. During the next iteration, any slave process may access any of the data from the previous iteration.

22 Claims, 15 Drawing Sheets

(52) U.S. Cl.
CPC .. *G06F 16/24539* (2019.01); *G06F 16/24561* (2019.01); *G06F 16/24566* (2019.01)

(58) Field of Classification Search
USPC .................................................. 707/773
See application file for complete search history.

(56) References Cited

U.S. PATENT DOCUMENTS

| | | | |
|---|---|---|---|
| 5,546,571 A * | 8/1996 | Shan | G06F 17/30955 |
| 5,822,750 A * | 10/1998 | Jou | G06F 17/30451 |
| 5,848,408 A | 12/1998 | Jackobsson | |
| 5,905,985 A | 5/1999 | Malloy | |
| 5,915,249 A | 6/1999 | Spencer | |
| 5,943,666 A | 8/1999 | Kleewein | |
| 5,960,428 A | 9/1999 | Lindsay | |
| 6,298,342 B1 | 10/2001 | Graefe | |
| 6,317,750 B1 | 11/2001 | Tortolani et al. | |
| 6,341,281 B1 | 1/2002 | MacNicol | |
| 6,345,267 B1 | 2/2002 | Lohman | |
| 6,353,828 B1 | 3/2002 | Ganesh | |
| 6,397,195 B1 | 5/2002 | Pinard et al. | |
| 6,397,204 B1 | 5/2002 | Liu | |
| 6,405,208 B1 | 6/2002 | Raghavan et al. | |
| 6,385,604 B1 | 7/2002 | Bakalash et al. | |
| 6,446,063 B1 | 9/2002 | Chen | |
| 6,460,045 B1 | 10/2002 | Aboulnaga et al. | |
| 6,484,179 B1 | 11/2002 | Roccaforte | |
| 6,529,896 B1 | 3/2003 | Leung et al. | |
| 6,618,729 B1 | 9/2003 | Bhashyam et al. | |
| 6,711,563 B1 | 3/2004 | Koskas | |
| 6,775,682 B1 | 8/2004 | Ballamkonda | |
| 6,959,304 B1 | 10/2005 | Teig et al. | |
| 6,965,891 B1 | 11/2005 | Jakobsson | |
| 7,028,046 B2 | 4/2006 | Anjur et al. | |
| 7,103,590 B1 | 9/2006 | Murthy | |
| 7,146,370 B1 * | 12/2006 | Klindt | G06F 17/30306 707/773 |
| 7,174,327 B2 * | 2/2007 | Chau | G06F 17/30917 |
| 7,324,991 B1 | 1/2008 | Anjur | |
| 7,337,163 B1 | 2/2008 | Srinivasan | |
| 7,366,730 B2 | 4/2008 | Greenfield et al. | |
| 7,392,248 B2 | 6/2008 | Bakalash | |
| 7,467,127 B1 | 12/2008 | Baccash et al. | |
| 7,617,312 B2 | 11/2009 | Tummalapalli | |
| 7,725,425 B2 | 5/2010 | Smartt | |
| 7,734,652 B2 | 6/2010 | Tamayo | |
| 7,769,733 B2 | 8/2010 | Chen et al. | |
| 7,774,303 B2 | 8/2010 | Shoup | |
| 7,797,320 B2 | 9/2010 | Thomsen | |
| 8,001,112 B2 | 8/2011 | Dombroski et al. | |
| 8,041,670 B2 | 10/2011 | Bakalash | |
| 8,176,265 B2 | 5/2012 | Coon | |
| 8,200,612 B2 | 6/2012 | Soylemez | |
| 8,209,208 B2 | 6/2012 | Kearney et al. | |
| 8,311,975 B1 | 11/2012 | Gonsalves | |
| 8,396,325 B1 * | 3/2013 | Kwatra | G06T 7/33 382/284 |
| 8,554,761 B1 | 10/2013 | Ahmed | |
| 8,660,985 B2 | 2/2014 | Wang | |
| 8,788,453 B2 | 7/2014 | Bakalash | |
| 8,799,209 B2 | 8/2014 | Bakalash | |
| 9,092,484 B1 | 7/2015 | Abraham | |
| 9,177,027 B2 * | 11/2015 | Kitsuregawa | G06F 17/30433 |
| 9,183,254 B1 | 11/2015 | Cole | |
| 9,324,036 B1 | 4/2016 | Iyer | |
| 9,971,808 B2 | 5/2018 | Kamath | |
| 10,091,061 B1 | 10/2018 | Peterson | |
| 2002/0095397 A1 | 7/2002 | Koskas | |
| 2002/0095421 A1 | 7/2002 | Koskas | |
| 2003/0208484 A1 | 11/2003 | Chang | |
| 2004/0153435 A1 | 8/2004 | Gudbjartsson et al. | |
| 2004/0225639 A1 | 11/2004 | Jakobsson | |
| 2005/0033741 A1 | 2/2005 | Dombroski et al. | |
| 2005/0131800 A1 | 6/2005 | Yoaz | |
| 2006/0026115 A1 | 2/2006 | Ahmed | |
| 2006/0080285 A1 | 4/2006 | Chowdhuri | |
| 2006/0101001 A1 | 5/2006 | Lindsay | |
| 2006/0184519 A1 | 8/2006 | Smartt | |
| 2006/0200772 A1 | 9/2006 | Dhanapal | |
| 2006/0235818 A1 * | 10/2006 | Muras | G06F 17/30587 |
| 2006/0235823 A1 | 10/2006 | Chong | |
| 2007/0027860 A1 | 2/2007 | Bestgen | |
| 2007/0083489 A1 | 4/2007 | Lawande | |
| 2007/0233648 A1 | 10/2007 | Zuzarte | |
| 2007/0239673 A1 | 10/2007 | Barsness | |
| 2007/0239691 A1 * | 10/2007 | Ordonez | G06F 17/30466 |
| 2007/0250473 A1 | 10/2007 | Larson | |
| 2007/0283356 A1 | 12/2007 | Du | |
| 2008/0059415 A1 | 3/2008 | Bakalash | |
| 2008/0162409 A1 * | 7/2008 | Meijer | G06F 16/24554 |
| 2008/0172354 A1 | 7/2008 | Zuarte | |
| 2008/0215544 A1 | 9/2008 | Galindo-Legaria | |
| 2008/0306903 A1 | 12/2008 | Larson | |
| 2009/0112793 A1 | 4/2009 | Ahemd | |
| 2009/0182720 A1 | 7/2009 | Cain et al. | |
| 2009/0265335 A1 | 10/2009 | Hoffman | |
| 2009/0281985 A1 | 11/2009 | Aggarwal | |
| 2010/0088325 A1 * | 4/2010 | Goldstein | G06F 17/30516 707/756 |
| 2010/0191716 A1 * | 7/2010 | Chen | G06F 16/24532 707/713 |
| 2010/0211577 A1 | 8/2010 | Shimizu | |
| 2010/0299337 A1 | 11/2010 | Aurin | |
| 2010/0299367 A1 | 11/2010 | Chakrabarti et al. | |
| 2011/0010139 A1 * | 1/2011 | Fuhrmann | G06F 17/504 703/2 |
| 2011/0040745 A1 | 2/2011 | Zaydman | |
| 2011/0047364 A1 | 2/2011 | Koju | |
| 2011/0055246 A1 | 3/2011 | Le Biannic et al. | |
| 2011/0137917 A1 | 6/2011 | Boland et al. | |
| 2011/0145244 A1 | 6/2011 | Kim et al. | |
| 2011/0173164 A1 | 7/2011 | Bendel | |
| 2011/0196857 A1 | 8/2011 | Chen | |
| 2011/0252033 A1 | 10/2011 | Narang | |
| 2011/0282864 A1 | 11/2011 | Collins | |
| 2012/0036146 A1 | 2/2012 | Annapragada | |
| 2012/0296883 A1 | 11/2012 | Ganesh | |
| 2012/0296942 A1 | 11/2012 | Arora | |
| 2013/0006965 A1 | 1/2013 | Barbas | |
| 2013/0060547 A1 | 3/2013 | Beran et al. | |
| 2013/0073538 A1 | 3/2013 | Beerbower | |
| 2013/0117255 A1 | 5/2013 | Liu | |
| 2013/0173528 A1 | 7/2013 | Betawadkar | |
| 2013/0198165 A1 | 8/2013 | Cheng | |
| 2013/0262443 A1 | 10/2013 | Leida | |
| 2013/0275364 A1 | 10/2013 | Wang | |
| 2013/0275365 A1 | 10/2013 | Wang | |
| 2013/0275367 A1 | 10/2013 | Shuma | |
| 2014/0052711 A1 | 2/2014 | Bamba et al. | |
| 2014/0095526 A1 | 4/2014 | Harada | |
| 2014/0095534 A1 | 4/2014 | Aingaran | |
| 2014/0099502 A1 | 4/2014 | Ziauddin | |
| 2014/0101201 A1 | 4/2014 | Yan | |
| 2014/0149480 A1 | 5/2014 | Catanzaro | |
| 2014/0181072 A1 | 6/2014 | Wong | |
| 2014/0181144 A1 * | 6/2014 | Kashiyama | G06F 17/30516 707/773 |
| 2014/0214796 A1 | 7/2014 | Barber | |
| 2014/0280020 A1 * | 9/2014 | Singamshetty | G06F 16/24532 707/714 |
| 2015/0019674 A1 | 1/2015 | Le Van Gong | |
| 2015/0088795 A1 | 3/2015 | Golovashkin et al. | |
| 2015/0088856 A1 | 3/2015 | Hunter et al. | |
| 2015/0088885 A1 | 3/2015 | Hopeman, IV et al. | |
| 2015/0088919 A1 | 3/2015 | Hunter et al. | |
| 2015/0261820 A1 | 9/2015 | Cheng | |
| 2015/0278309 A1 | 10/2015 | Harada | |
| 2015/0379077 A1 | 12/2015 | Grosse | |
| 2016/0034521 A1 * | 2/2016 | Lumby | G06F 17/30371 707/690 |
| 2016/0179889 A1 | 6/2016 | Chiang | |
| 2016/0232206 A1 | 8/2016 | Hayamizu | |
| 2016/0378751 A1 | 12/2016 | Kamath | |
| 2016/0378754 A1 | 12/2016 | Kamath | |

(56) References Cited

U.S. PATENT DOCUMENTS

2016/0378796 A1 12/2016 Hopcroft
2017/0116266 A1 4/2017 Lahorani et al.
2017/0116272 A1 4/2017 Lahorani et al.

OTHER PUBLICATIONS

Ashdown et al., "Oracle Database SQL Tuning Guide 12c Release 1 (12.1)", dated May 2013, 566 pages.
Lahorani, U.S. Appl. No. 15/268,522, filed Sep. 16, 2016, Office Action, dated Aug. 15, 2018.
U.S. Appl. No. 14/033,251, filed Sep. 20, 2013, Final Office Action, dated Dec. 21, 2015.
Hopeman, U.S. Appl. No. 14/033,251, filed Sep. 20, 2013, Notice of Allowance, dated Apr. 12, 2017.
Hunter, U.S. Appl. No. 14/033,358, filed Sep. 20, 2013, Final Office Action, dated Sep. 21, 2017.
Hunter, U.S. Appl. No. 14/033,358, filed Sep. 20, 2013, Interview Summary, dated May 1, 2017.
Hunter, U.S. Appl. No. 14/033,358, filed Sep. 20, 2013, Interview Summary, dated Dec. 21, 2016.
Hunter, U.S. Appl. No. 14/033,358, filed Sep. 20, 2013, Office Action, dated Mar. 9, 2017.
Hunter, U.S. Appl. No. 14/033,358, filed Sep. 20, 2017, Interview Summary, dated Dec. 11, 2017.
Lahorani, U.S. Appl. No. 15/268,522, filed Sep. 16, 2016, Final Office Action, dated Jan. 11, 2019.
U.S. Appl. No. 14/033,251, filed Jan. 22, 2016, Interview Summary, dated Jan. 22, 2016.
Hopeman IV, U.S. Appl. No. 14/033,251, filed Sep. 20, 2013, Interview Summary, dated Dec. 27, 2016.
U.S. Appl. No. 14/033,251, filed Sep. 20, 2013, Final Office Action, dated Nov. 1, 2016.
U.S. Appl. No. 14/033,358, filed Sep. 20, 2013, Office Action, dated Apr. 6, 2016.
U.S. Appl. No. 14/033,251, filed Sep. 20, 2013, Interview Summary, dated Aug. 16, 2016.
U.S. Appl. No. 14/033,251, filed Sep. 20, 2013, Office Action, dated May 27, 2016.
U.S. Appl. No. 14/033,358, filed Sep. 20, 2013, Advisory Action, dated Jan. 19, 2017.
U.S. Appl. No. 14/033,358, filed Sep. 20, 2013, Final Office Action, dated Oct. 5, 2016.
U.S. Appl. No. 14/033,358, filed Sep. 20, 2013, Final Office Action, dated Nov. 10, 2015.
U.S. Appl. No. 14/033,358, filed Sep. 20, 2013, Office Action, dated Jun. 1, 2015.
U.S. Appl. No. 14/033,251, filed Jul. 30, 2015, Office Action, dated Jul. 30, 2015.
MSDN Library, "Dimension Set Entires", NAV 2013 Documentation, dated Nov. 21, 2012, Retrieved on Sep. 13, 2017, 22 pages.
Lahorani, U.S. Appl. No. 15/268,519, filed Sep. 16, 2016, Office Action, dated Oct. 31, 2018.
Lahorani, U.S. Appl. No. 15/268,522, filed Sep. 16, 2016, Interview Summary, dated Mar. 22, 2019.
Lahorani, U.S. Appl. No. 15/268,522, filed 069/16/2016, Office Action, dated Nov. 20, 2019.
Lahorani, U.S. Appl. No. 15/268,519, filed Sep. 16, 2016, Notice of Allowance, dated May 23, 2019.
Ziauddin, U.S. Appl. No. 15/268,335, filed Sep. 16, 2016, Office Action, dated May 31, 2019.

* cited by examiner

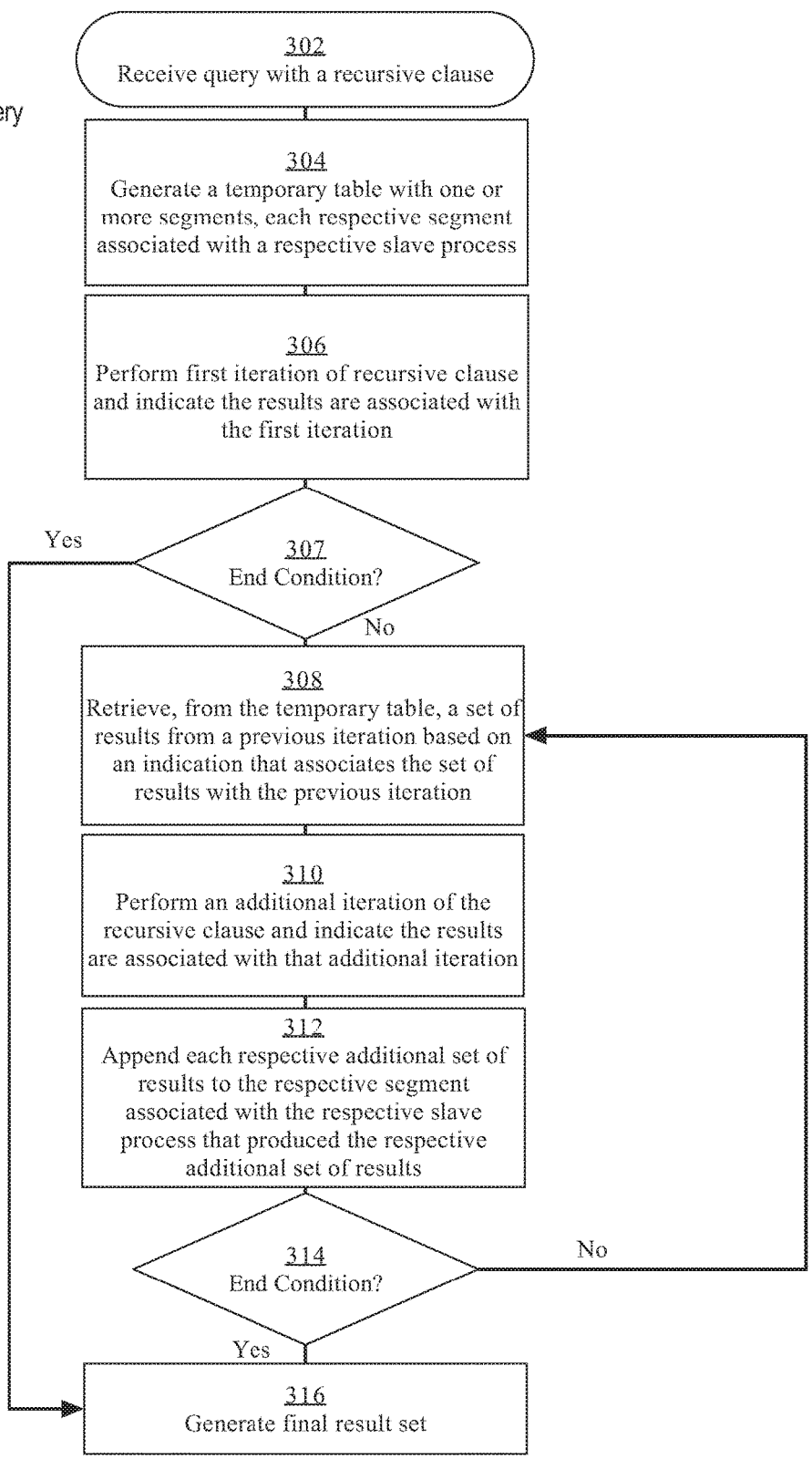

Relationship Table 450

| ID | FID | TID | Cost |
|---|---|---|---|
| 1 | 1 | 2 | .86 |
| 2 | 1 | 10 | .77 |
| 3 | 2 | 1 | .34 |
| 4 | 2 | 3 | .56 |
| 5 | 2 | 6 | .76 |
| 6 | 2 | 7 | .52 |
| 7 | 3 | 2 | .48 |
| 8 | 3 | 4 | .84 |
| 9 | 3 | 5 | .22 |
| 10 | 4 | 3 | .12 |
| 11 | 5 | 3 | .45 |
| 12 | 6 | 2 | .86 |
| 13 | 7 | 2 | .98 |
| 14 | 7 | 8 | .11 |
| 15 | 7 | 9 | .12 |
| 16 | 8 | 7 | .47 |
| 17 | 9 | 7 | .33 |
| 18 | 10 | 1 | .32 |
| 19 | 10 | 11 | .77 |
| 20 | 11 | 10 | .68 |
| 21 | 11 | 12 | .15 |
| 22 | 12 | 11 | .23 |

FIG. 4B

Example Query 460

```
WITH rw (fid, tid, iters, path) as
(
    SELECT fid, tid, 1, to_char(fid)
        FROM tedges_tw
        WHERE fid < tid
    UNION ALL
    SELECT t.fid, t.tid, r.iters+1, r.path || '/' || to_char(t.fid)
        FROM rw r, tedges_tw t
        WHERE r.tid = t.fid AND t.fid < t.tid
)
SELECT fid, tid, iters, path
    FROM rw;
```

INITIALIZATION BRANCH 462

RECURSIVE BRANCH 464

FINALIZATION BRANCH 466

FIG. 4C

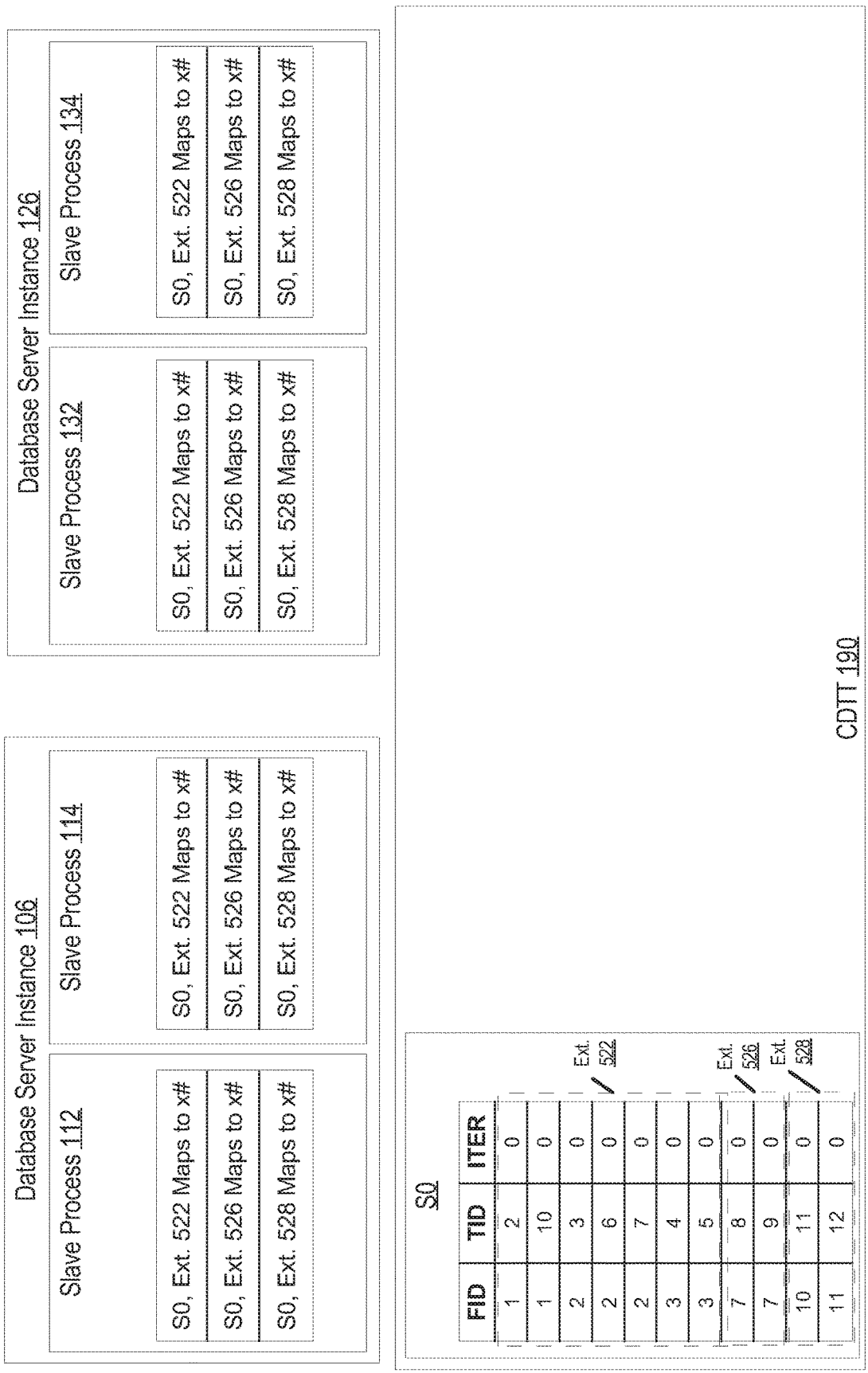

Final Results Table 700

| FID | TID | ITERS | PATH |
|---|---|---|---|
| 1 | 2 | 0 | 1 |
| 1 | 10 | 0 | 1 |
| 2 | 3 | 0 | 2 |
| 2 | 6 | 0 | 2 |
| 2 | 7 | 0 | 2 |
| 3 | 4 | 0 | 3 |
| 3 | 5 | 0 | 3 |
| 2 | 3 | 1 | 1/2 |
| 2 | 6 | 1 | 1/2 |
| 2 | 7 | 1 | 1/2 |
| 3 | 4 | 1 | 2/3 |
| 3 | 5 | 1 | 2/3 |
| 3 | 4 | 2 | 1/2/3 |
| 3 | 5 | 2 | 1/2/3 |
| 7 | 8 | 1 | 2/7 |
| 7 | 9 | 1 | 2/7 |
| 7 | 8 | 2 | 1/2/7 |
| 7 | 9 | 2 | 1/2/7 |
| 7 | 8 | 0 | 7 |
| 7 | 9 | 0 | 7 |
| 10 | 11 | 1 | 1/10 |
| 10 | 11 | 0 | 10 |
| 11 | 12 | 0 | 11 |
| 11 | 12 | 1 | 10/11 |
| 11 | 12 | 2 | 1/10/11 |

FIG. 7

PARALLEL EXECUTION OF QUERIES WITH A RECURSIVE CLAUSE

BENEFIT CLAIM

This application claims the benefit of Provisional application 62/245,958, filed Oct. 23, 2015, the entire contents of which is hereby incorporated by reference as if fully set forth herein, under 35 U.S.C. § 119(e). Portions of the specification may also be supported by Provisional application 62/245,867 and Provisional application 62/245,869, both filed Oct. 23, 2015, the entire contents of which are both hereby incorporated by reference.

FIELD OF THE INVENTION

The present invention relates to parallel execution of queries, and more specifically to improved computer-implemented techniques for executing a query with a recursive clause using multiple processes in-parallel.

BACKGROUND

A database stores data in a logical format exposed to external entities (e.g., users and applications) as rows and columns. The data in the database is accessed through a database management system (DBMS) that accepts "database queries" in a standard language such as SQL. The standard language provides clauses that allow a user to access rows of database objects (e.g., a table or index) based on data items that may be in a specific columns of a particular database object. Database queries can include many kinds of clauses that declare different kinds of operations, such as aggregations, joins, inserts, updates, or deletions of rows. A specific type of clause is a recursive clause.

A certain type of query is a query with a recursive clause. A query with a recursive clause requires multiple iterations to execute, and the results from a previous iteration are used to execute the next iteration. Typically, the process uses a private buffer cache to store the intermediate result set of a previous iteration in order to perform a database operation for the current iteration. When multiple processes are needed to execute a query in parallel, the intermediate results in a private buffer are only available to the process that generated results for that buffer. Thus, a process can only work on the results that it buffers and not results produced by another process. For this reason, a query with a recursive clause is typically only executed by a single process. Unfortunately, executing a query with a recursive clause using only a single process creates a bottleneck in query execution.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a flow diagram illustrating a program flow of in-parallel execution of query with a recursive clause.

FIG. 4B is a table that records the likelihood that a receiver of a single message will resend that message to another user in affinity graph in FIG. 4A;

FIG. 4C is an example query that may be used to calculate the transitive closure of the affinity graph in FIG. 4A based on the records in FIG. 4B;

FIG. 5B is a block diagram illustrating a system state of the system architecture in FIG. 1A after execution of the initialization branch of the example query in FIG. 4C using an on-disk CDTT;

FIG. 7 is a table comprising the results of the example query in FIG. 4C; and

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

General Overview

Techniques are described herein for executing queries with a recursive clause using a plurality of processes that execute database operations in parallel. A process known as the query optimizer in a database server determines a number of processes that should be used to execute the query in parallel.

A process known as the query coordinator in a database server locks a plurality of processes referred to herein as slave processes to execute the query in parallel. For each iteration of the recursive query, work granules are divided up out of each segment of a database object and assigned to each of the plurality of slave processes.

Each slave process of the plurality of slave processes either generate or are assigned a segment that is part of a temporary table. The slave processes produce a set of one or more results for each given iteration, and mark the results as associated with the given iteration. As each respective slave process produces a portion of a result set for a given iteration, that slave process appends said portion of the result set to the respective segment that the respective slave process manages. Each slave process then publishes or stores, to one or more sources that are available to the slave processes, a reference to the newly generated results.

During the next iteration, each slave process scans a portion of the temporary table to access data from the previous iteration, and then sends rows from said portion to another slave process based on a distribution algorithm. The slave processes that receive these rows perform one or more database operations for the next iteration. After an end condition is met, the slave processes may perform a final set of one or more database operations against the entire temporary table.

System Overview

Figure 1A:
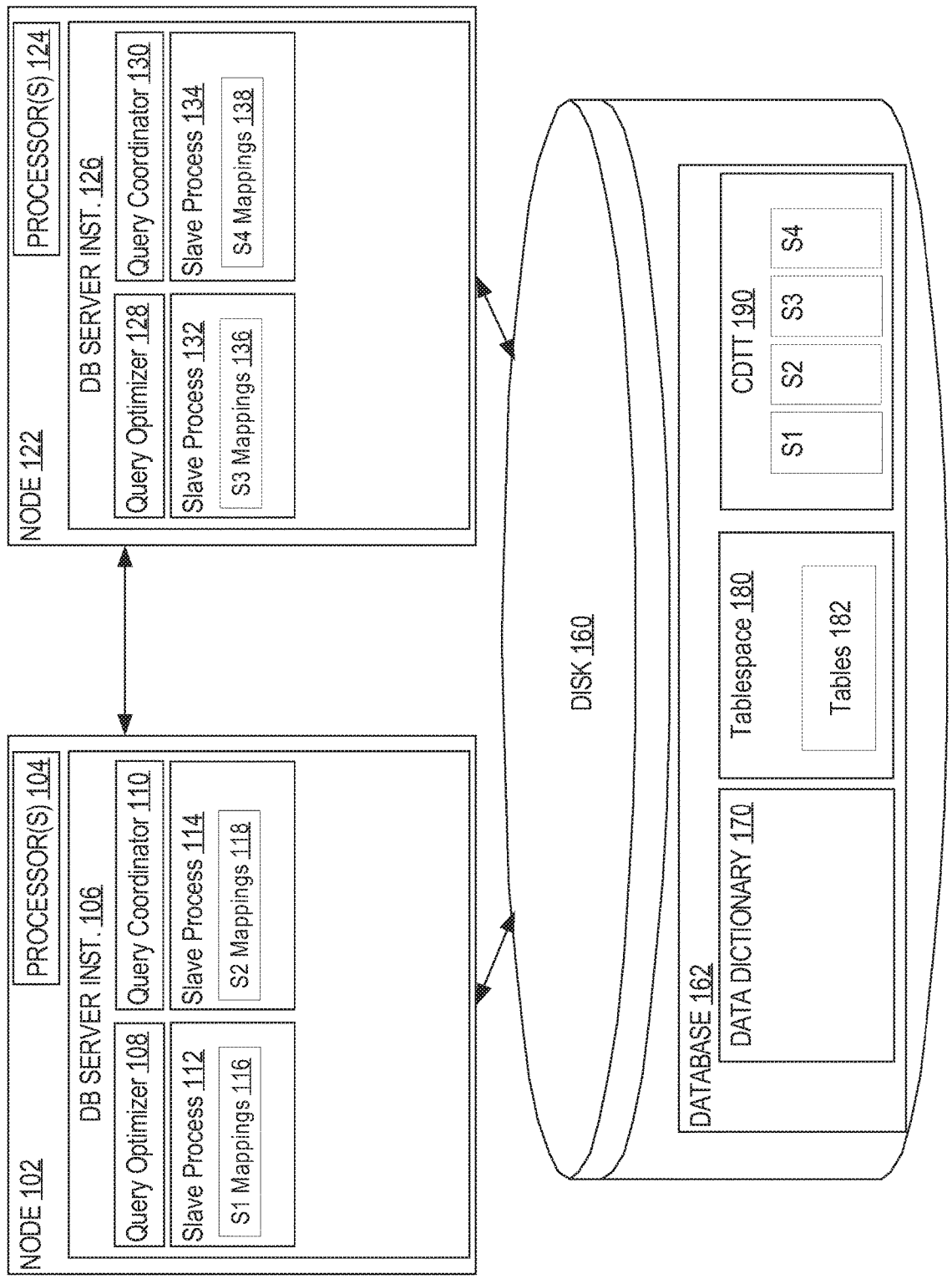
FIG. 1A is a block diagram illustrating an example of a system architecture configured for parallel execution of a query with a recursive clause using an on-disk cursor duration temporary table before a plurality of segments have been merged into a single segment of a temporary table.
Figure 1B:
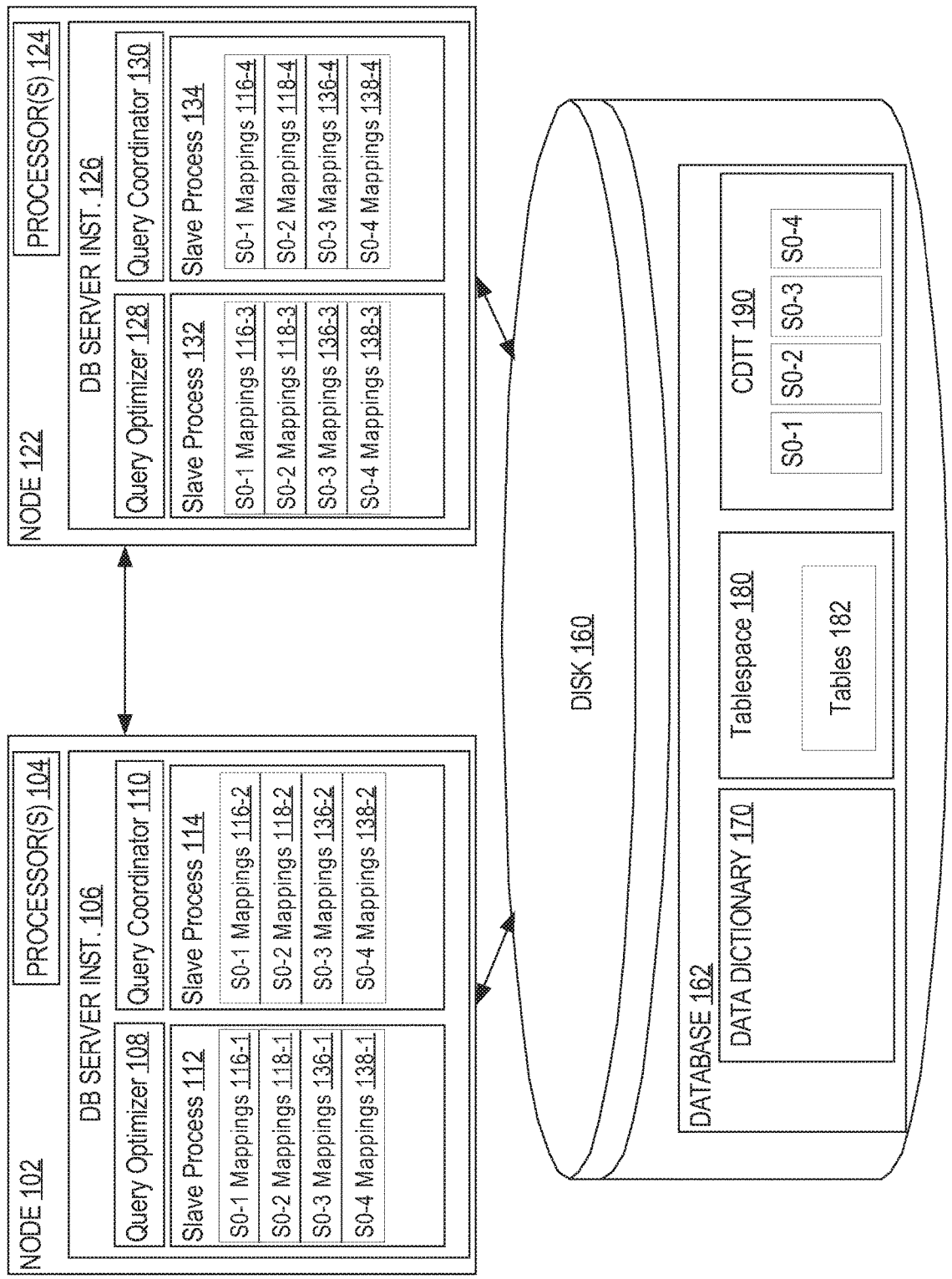
FIG. 1B is a block diagram illustrating an example of a system architecture configured for parallel execution of a query with a recursive clause using an on-disk cursor duration temporary table after a plurality of segments have been merged into a single segment of a temporary table.
Figure 2:
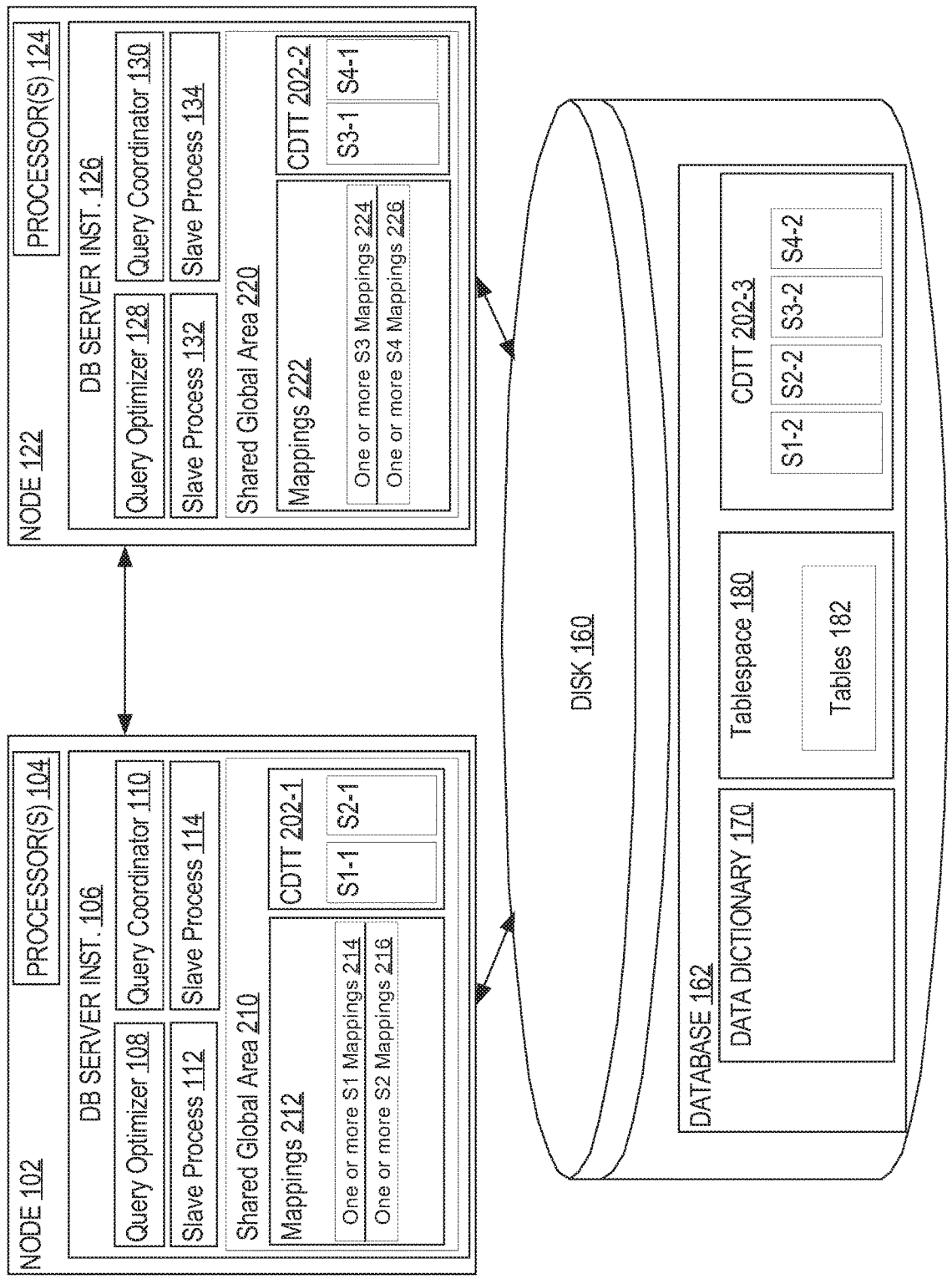
FIG. 2 is a block diagram illustrating an example of a system architecture configured for parallel execution of a query with a recursive clause using an in-memory cursor duration temporary table.

FIGS. 1A, 1B, and 2 are a block diagrams illustrating example system architectures of a relational database management system (rDBMS) 100 with processors 104, 122 and volatile memory (not shown) executing database server instances 106, 126. For purpose of illustration, the rDBMS 100 is shown as two database server computers ("nodes") 102, 122 executing database server instances 106, 126 coupled to a database 162 stored in persistent storage ("disk") 160. In alternative embodiments, the rDBMS 100 may comprise one or more database server computers each executing one or more database server instances coupled to a database stored on one or more shared persistent storage devices (e.g., hard disks or flash memories). For example, while in the illustrated embodiment database server computer 102 is executing a single database server instance 106, in alternative embodiments a single database server computer may execute three database server instances, wherein each database server computer is operatively coupled to the same shared disk(s).

Database server instances 106, 126 execute database commands that are submitted to database server computer 102, 122 by one or more users or database applications. These users and database applications may be referred to herein as external entities to signify that they are external to the internal programs and structures of the rDBMS 100. An external entity may be connected to the rDBMS 100 through a network in a client-server relationship.

Each database server instance 106, 126 further comprises processes such as a query optimizer 108, 128; a query coordinator 110, 130; and one or more processes that execute database operations in parallel ("slave processes") 112, 114, 132, 134. Each database server instance also comprises local memory referred to as a shared global area (SGA).

A query is generally processed by a database server instance in two phases: query compilation and query execution. During query compilation, a process within a database server (e.g., query optimizer 108 or 148) receives a database query, parses the query, and determines an execution plan for executing the query. The execution plan may be stored in a cursor and sent to a query coordinator. During query execution, a process within a database server (e.g., query coordinator 110 or 140) manages a set of one or more processes (e.g., slave processes 112, 114, 132, 134) to execute database operations of the query execution plan generated by the query optimizer.

A DBMS may execute the execution plan as a distributed operation. Plan operations may be divided into work granules, some of which may be executed in parallel by a plurality of slave processes or threads. A slave process may contain one or more threads, and could be referred to as a thread when the slave processes comprises a single thread. A thread, when reading data, could be referred to as a reader thread. A thread, when writing data, could be referred to as a writer thread.

Typically, a query coordinator generates work granules and assigns the work granules to slave processes. In some embodiments, rather than the query coordinator generating and assigning work granules to slave processes, slave processes assign their own work granules. Each slave process may determine a work granule to execute and then indicate the next work granule a slave process can execute. For example, when reading from a table, each respective slave process may determine that a first work granule includes reading a portion of the table and a second work granule includes reading the next portion of the table. A first particular slave process may select and execute the first work granule. Either the first particular slave process or another free slave processes may select and execute the second work granule, and so on.

Data Dictionary

Database 162 comprises tablespaces, including tablespace 180, which are files used for storing data for database objects (e.g., tables, temporary tables, indexes, logs, and control files). Metadata regarding these database objects is normally stored in data dictionary 170.

The data dictionary is a central part of data management. For example, in order for a process within a database server instance to access the database, the process performs the following actions:

Any process may accesses the data dictionary 170 to find information about users, schema objects, and storage structures before providing access to a particular table to execute operations caused by a DML statement.

Before providing access to a particular table, a process may modify the data dictionary 170 to execute operations caused by a data definitional language (DDL) statement.

Table Data Structures

Table data is stored in one or more ranges of physical addresses on persistent storage or volatile memory in various physical data structures, which comprise:

data blocks extents segments

A table is composed of one or more segments; segments are composed of extents, and extents are composed of data blocks. The smallest table data structure is referred to as a data block. A data block is an atomic unit of data that a database server may request to read from and write to a storage device that stores table data in, for example, a block-mode storage device. In order to retrieve a row from a storage device, a data block containing the row is read into memory, and the data block is further examined to determine the row's location within the data block.

A data block may be constrained to a discrete number of physical addresses (i.e., a discrete size) for paging purposes. A data block may comprise data items and header metadata for data block specific information such as transaction history of data items within the data block. In a preferred embodiment, the data items correspond to a set of logically contiguous rows organized into physical columns in row-major format. For example, a data block may contain two rows of data items, R1C1, R1C2, R1C3, R2C1, R2C2, R2C3, and metadata regarding said data items in a discrete number of contiguous memory addresses.

The next largest data structure of a table is referred to as an extent. An extent comprises a set of contiguous data blocks (i.e., contiguous within an address space). An extent may also comprise metadata describing the length of the extent, the number of data blocks in the extent, the end address of the extent, or any combination thereof. For example, an extent may comprise two data blocks B1 and B2 and head metadata describing the length of the extent as 2.

The next largest data structure of a table may be referred to as a segment. The "data" of a segment comprises a set of extents. The "header metadata" of a segment may comprise pointer data to the locations of each extent of the segment.

Cursor

A cursor is a data structure that stores information for processing a specific query or database manipulation language (DML) statement. A DML statement may be a read only statement or a statement that specifies to insert, update, or otherwise modify database data. The cursor may contain information regarding a query execution plan. A cursor may be declared internally so the data referenced by the cursor can be later accessed within execution of the same query or DML statement.

In some embodiments, a cursor may be stored for a limited amount of time even after query execution has been completed. If the same query or even a similar query is received by the database management system, the cursor may be used to provide an execution plan for that query. Metadata may be stored in the cursor regarding statistics on query execution. This metadata may also be used to optimize future executions of similar queries. For example, metadata on data skew during in parallel processing may cause the query optimizer to select a different distribution method for future queries.

Cursory Duration Temporary Tables

In order to execute a query, database management system 100 may create one or more temporary tables (e.g., temporary table 190) to store one or more sets of rows. For example, after receiving a query with clause that requires multiple iterations to execute, DBMS 100 may create a temporary table to store the results of an iteration. For each additional iteration, the results of the previous iteration may be processed (e.g., in a join statement), and then additional results may be appended to the table. The temporary table may be referred to herein as a cursor duration temporary table (CDTT). Once the cursor is removed, the temporary table is removed from the database.

In an embodiment, the temporary table is a cursor duration temporary table, and metadata that defines the temporary table remains in memory until the cursor ages out. A cursor remains in memory for the duration of query execution and then remains until another cursor needs the memory held by that cursor; thus the cursor ages out.

On-Disk CDTT

One approach for executing a recursive clause is creating an on-disk CDTT. Managing an on-disk CDTT is a two-step process for each iteration. To add data to an on-disk CDTT during in-parallel execution, each slave process of a set of slave processes executing the query (e.g., slave processes 112, 114, 132, 134) creates a respective segment (e.g., $S_1$, $S_2$, ..., $S_N$) on shared disk 160. Then each slave process saves metadata defining the respective segment created by that respective slave process in their respective local memory rather than publishing the reference to the data dictionary 170.

FIG. 1A is a block diagram illustrating an example of a system architecture configured for parallel execution of a query with a recursive clause using an on-disk cursor duration temporary table before a plurality of segments have been merged into a single segment of a temporary table. CDTT 190 is stored entirely on disk, but the mappings 116, 118, 136, 138 for the CDTT are stored in the local memory of different slave processes.

After the data for a given iteration is loaded into a given segment, the query coordinator 110 or 130 (i.e., a master process) merges, through a metadata operation, the respective segments (e.g., $S_1$, $S_2$, ..., or $S_N$) owned by the slave processes into a master segment (e.g., $S_0$).

FIG. 1B is a block diagram illustrating an example of a system architecture configured for parallel execution of a query with a recursive clause using an on-disk cursor duration temporary table after a plurality of segments have been merged into a single segment of a temporary table. CDTT 190 is still stored entirely on disk, but the mappings for CDTT 190 are now stored entirely in the local memory of each slave process after query coordinator merges and sends the information to the slave processes 112, 114, 132, 134. The segments S1-S4 are now referred to as part of S0 (i.e., S0-1, S0-2, S0-3, S0-4). Because the merge was performed through a metadata operation, the data of the segments has not moved. Instead, the mappings 116, 118, 136, 138 have changed. Each slave has S1-S4 segment information received from the query coordinator and store them in their local memory. In alternative embodiments, the merge could be performed through moving actual data.

During the next iteration, a process (e.g., query coordinator 110) in a database server (e.g., node 102) assigns each slave process 112, 114, 132, 134 a portion of CDTT 190. Each respective slave process then scans and distributes their assigned portion. As data is received from the distribute operation, each respective slave process performs one or more database operations on those rows for the next iteration.

Multiple iterations may be performed, the results of each iteration are merged in to CDDT 190 until an end condition is met. After an end condition is met, a final set of one or more database operations may be performed against the entire on-disk CDTT 190.

In-Memory CDTTs

An improvement on the above technique is having the cursor duration temporary table defined as an aggregate of in-memory segments. Because each respective slave process has ownership affinity over a segment during the entirety of query execution, there is no need to merge all of the in-memory segments into a "master segment" (e.g., $S_0$).

FIG. 2 is a block diagram illustrating an example of a system architecture configured for parallel execution of a query with a recursive clause using an in-memory cursor duration temporary table. In-memory CDTT 202 is created with a plurality of segments S1, S2, S3, S4. Each segment is managed by a respective process (e.g. slave processes 112, 114, 132, 134).

In a consumer-producer approach, the slave processes that are local to a particular portion of a temporary table are assigned to "consume" a local portion of the temporary table by scanning a particular set of rows of that table and distributing the scanned rows to other slave processes for "producing" new rows based on the database operation that is being performed. For example:

Slave Process 112 may be assigned to scan and distribute data based on work granules associated with segment S1-1 or S2-1, which is stored local to slave process 112 based on mappings 212

Slave Process 114 may be assigned to scan and distribute data based on work granules associated with segment S1-1 or S2-1, which is stored local to slave process 114 based on mappings 212

Slave Process 132 may be assigned to scan and distribute data based on work granules associated with segment S3-1 or S4-1, which is stored local to slave process 132 based on mappings 222

Slave Process 112 may be assigned to scan and distribute data based on work granules associated with segment S3-1 or S4-1, which is stored local to slave process 134 based on mappings 222

Even though CDTT 202 is optimized to be stored in volatile memory, CDTT 202 need not be stored entirely in volatile memory. For example, in some cases, CDTT 202 may exceed the space that has been allotted to it in volatile memory. In such cases, the temporary table may spill over to disk 160 as shown in FIG. 2 by CDTT 202-3.

Iteration Column

In an embodiment, the results of each iteration of a query with a recursive clause are associated with an iteration value. The iteration value may be a number, string, or some other value that indicates a current iteration. For example, the initial iteration is associated with an iteration value of 0. The second iteration is then associated with an iteration value of 1 and the third iteration is associated with an iteration value of 2, such that the $N^{th}$ iteration of the iteration stage is associated with iteration value of N.

An iteration may require data that was generated and stored for one or more prior iterations. For example, iteration N may require data from the last iteration N−1, some other prior iteration K, or a set of iterations, such as iterations L through N−1. In an embodiment, records of the temporary table are associated with a respective iteration value. Storing data in the temporary table may include storing the iteration value associated with an iteration.

In some embodiments, an additional iteration column is added to the CDTT. The iteration column provides an indication of the iteration for a particular set of results, so the slave processes may retrieve the correct results from the temporary table during execution of the recursive branch of the query. The iteration column may be associated with one or more properties. For example, in an embodiment, the iteration column is a system generated hidden column that is only accessible internally by the DBMS. In other embodiments, the iteration column is an invisible column. Invisible columns are exposed to external entities when specifically queried, but not through general SELECT*statements.

Saving Iteration Tags with Extents in CDTT

An extent generally refers to a contiguous (i.e. within an memory address space) set of data blocks used to store rows of a database. In an embodiment, an extent includes header metadata that defines either the length of the extent and/or the last data block address of the extent. Thus, to read an entire extent, a process performs a quick read of the header metadata, and then continues to read the rest of the extent until meeting a condition defined by the header metadata.

In some embodiments, additional metadata may be stored in the head of an extent. For example, extents may be created for a cursor duration temp table that has been created for a query with a recursive clause. In this case, the head of the extent may contain an additional tag that indicates what iteration the extent was created for. Thus, when a process reads the cursor duration temp table to pull results from the previous iteration, the process needs not perform a "full table scan" by reading every block in the CDTT. Instead, the process reads the head of each extent, and determines whether the extent was created by the previous iteration. Extents that were not created by the previous iteration are not read. Only blocks from extents that store information relevant to a particular iteration may be read. Because the extent head is read but not all blocks in each extent are read, this process may be referred to herein as "extent pruning."

Queries with a Recursive Clause that Trigger CDTTs

In an embodiment, a database server instance is configured to receive a query with a recursive clause, parse said query, and generate an execution plan that involves a CDTT based on said parsed query. Two examples of queries that may include a recursive clause that trigger a CDTT to be generated are "connect by" queries and "recursive with" queries. For example, SELECT fid, tid, level iters, SYS_CONNECT_PATH(fid, '/') path
FROM tedges_tw
START WITH fid<tid
CONNECT BY PRIOR tid=fid and fid<tid;

In this query the recursive clause is seen in the CONNECT BY statement. To get results for a current iteration, a process performs a join between the data items from the "tid" column of the results in the previous iteration and the data items from the "fid" column of the table tedges_tw.

A "recursive with" query has a WITH clause that references itself. As used herein, a WITH clause is a database statement in ANSI SQL that provides an alias for a subquery. For example, if a query includes a particular subquery multiple times, a user may define a WITH clause that includes the sub-query. Then query may reference the WITH clause rather than repeat the contents of the sub-query multiple times. A "recursive with" query has a WITH clause that references itself. In an embodiment, an execution plan for a query that includes a recursive WITH clause may define and create a temporary table for the WITH clause. Plan operations that include the WITH clause may refer to a temporary table such as CDTT 190 or CDTT 202.

In-Parallel Execution Overview

FIG. 3 is a flow diagram illustrating a program flow 300 of in-parallel execution of a query with a recursive clause. At step 302, a database management system receives a query with a recursive clause. A query optimizer then generates a query execution plan. The query execution plan may include an optimized number of slave processes to execute the query. These slave processes may be pulled from an existing pool according to how the database management system is configured and available system resources. In some embodiments, if the pool of slave processes is low, a new slave process can be spawned spontaneously.

At step 304, the database management system generates a temporary table with one or more segments, each respective segment associated with a respective slave process. At step 306, a query coordinator assigns work granules to the slave processes to perform the first iteration of the recursive clause and to indicate the results are associated with the first iteration. In an embodiment, the database operations required to execute the first iteration are performed in parallel by a plurality of slave processes that have ownership over segments of a cursor duration temporary table. The results of the first iteration are stored in the temporary table generated at step 306, where each slave process stores respective results generated by that slave process in a respective segment associated with that slave process. At step 307, a stopping condition test is applied because execution may stop right after the first iteration (i.e., the initialization branch) is executed.

At step 308, the same slave processes are locked to retrieve, from the temporary table generated at step 304, the set of results generated from the previous iteration based on an indication that associates the set of results with the previous iteration. In step 308, the query coordinator divides up data in the temporary table and distributes work granules to be performed by each slave process. In an embodiment, each slave process performs "extent pruning" in parallel by only reading extents that have an indication that the given extent hosts information generated from the previous iteration. In alternative embodiments, an entire table scan is performed and each slave process reads a portion of the temporary table in parallel.

At step 310, the slave processes then perform an additional iteration of the recursive clause in parallel and indicate the results are associated with that additional iteration. At step 312, the results of the additional iteration are stored in the temporary table generated at step 304, where each slave process stores the respective results generated by that slave process in the respective segment managed by that slave process.

At step 314, a query coordinator reviews the results generated at step 310 to determine if query execution of the recursive clause is complete. An example end condition is if no results were generated for an iteration. Another example end condition is if a maximum number of iterations have been reached. If no end condition has been met, then the process repeats from step 308. If an end condition has been found, then the flow continues to step 316.

At step 316, the database management system generates a final result set. Generating a final result set may comprise aggregating the results generated from the previous portions of the query. Generating a final result set may also comprise performing a final set of database operations on the results generated from the previous portions of the query. These database operations may also be performed in parallel.

Example Use Case—Graph Problems

Queries with recursive clauses can be very useful in processing hierarchal relationships and graphical relationships. For example, a collection of entities may be related to one another through "edges," and one can calculate the degrees of separation between two entities through the number of edges connecting those two entities. Each edge may be associated with a cost. A problem known generally as the travelling salesman problem is to calculate the minimum cost of travelling between two entities through multiple intermediate entities.

Another interesting problem in processing relationships is referred to as transitive closure. Informally, the transitive closure for a set of entities is the set of all entities that can be accessed from any starting entity. Solving for a transitive closure involves determining the first degree relationships of a particular entity, and then determining the next degree relationships from the results achieved in the previous determination. The problem is solved when the Nth degree relationships have been determined and no additional relationships exist. Transitive closures can be used to model travelling from a starting airport to other airports. Transitive closures can also be used to model how a message is sent to a group of followers, and from there the same message is resent by those followers to their followers and so on to the Nth degree.

Implementation Example

Figure 4A:
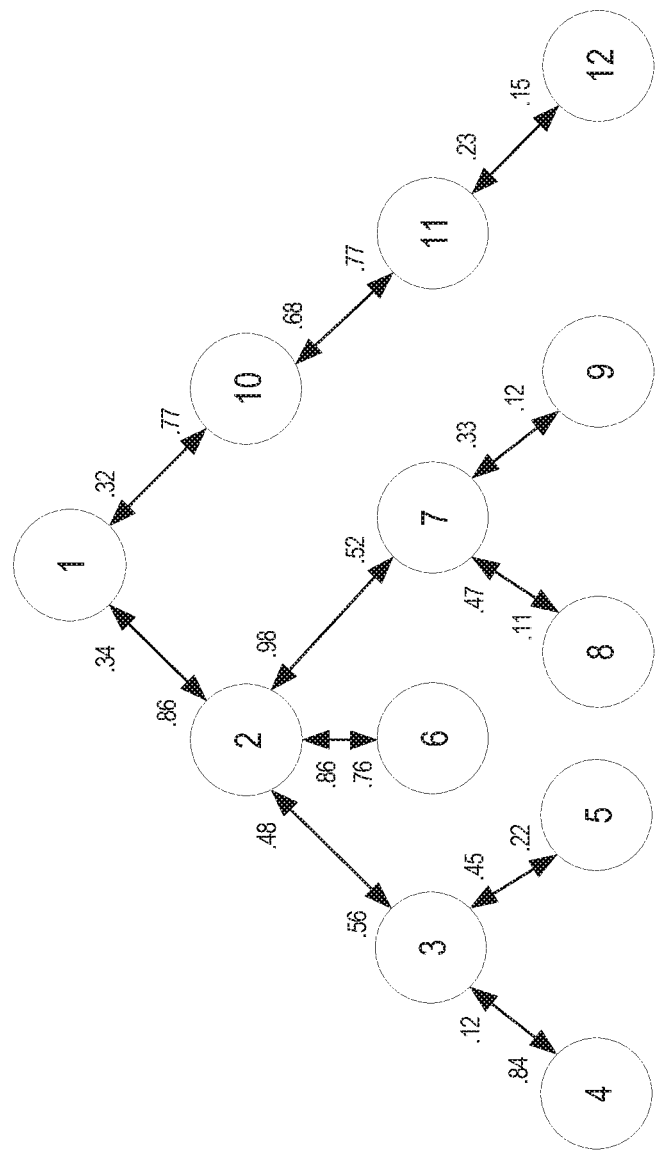
FIG. 4A is an affinity graph of users relating to other users (e.g., followers) through degrees of separation between one user and any other user.

FIG. 4A is an affinity graph of users relating to other users (e.g., followers) through degrees of separation between one user and any other user. In FIG. 4A, each entity is represented by a user identification "uid" integer, and the relationships between entities are represented by two directional arrows. A cost is shown next to the head of each arrow, representing the probability that a particular message will be resent after receiving the particular message from another user. The cost of sending an initial message is always one because there is a one hundred percent chance that the initial message is sent.

A record may be stored in a database of each relationship presented in the affinity graph 400. For example, FIG. 4B is a table of records that track the probability that a single message will be resent from a particular "uid" to a particular "uid" in affinity graph 4A. Table 450 comprises an "fid" column which refers to the user identifier of who the message was from, a "tid" column which refers to user identifier of who the message is to, and a "cost" column which refers to a probability that a particular message will be resent after receiving the particular message. Table 450 may be one of many tables in tables 182.

In the above example, a message may be sent to a set of one or more followers of a particular user. Then the message is resent to followers of the followers, and finally the message is sent to followers of the second degree followers. We may solve for the transitive closure of the set of entities with UIDs 1-12 using a query with a recursive clause. The query should traverse the edges described in table 450 to determine 1st degree relationships, 2nd degree relationships, and so on. FIG. 4C is an example query that may be used to calculate the transitive closure of the affinity graph in FIG. 4A based on the records in FIG. 4B.

Query 460 may be broken into three branches. Execution of each branch may be performed in-series, but multiple slave processes may be used to execute database operations required by any particular branch in-parallel. Initialization branch 462 is used to create a first iteration of results in the CDTT. Recursive branch 464 is then used to generate additional iterations using records from the previous iteration to generate results for each current iteration. Once database operations required by recursive branch 464 have ceased because an end condition has been met, database operations required by finalization branch 466 may be performed against the entire temporary table that was generated by the UNION ALL of initialization branch 462 and recursive branch 464.

Query Compilation

A database server instance (e.g., DB server instance 106) may receive query 460 as presented in FIG. 4C, which traverses the graph represented by table 450 and outputs the paths between entities in the graph.

Based on the clauses of query 460, a query optimizer (e.g., query optimizer 108) generates an execution plan for executing the query. Determining an execution plan may entail determining an optimal execution plan of a plurality of different execution plans, based on for example, database statistics. These statistics are used to estimate the cost of performing each database operation in an execution plan based on metrics regarding the distribution of data items in the table(s) that the operations are being performed against and the cost of performing previous operations that are similar or the same as the operations being performed.

Some database operations must occur before other database operations. For example the database operations required by initialization branch 462 must be performed before the database operations required by recursive branch 464. However, in other cases, there is no need to preserve the order of database operations as received in the query.

Effective query compilation involves determining a first database operation may be performed before a second database operation, which significantly reduces the work required to get a result. For example, recursive branch 464 in query 460 includes two predicates r.tid=t.fid AND t.fid<t.tid. The database management system can reduce the estimated cost of performing both predicates by performing the predicate that is more likely to remove the most results first. For example if r.tid=t.fid is likely to filter out 90% of the results and t.fid<t.tid is only likely to filter out 50% of the results, then performing the r.tid=t.fid first may save significant computational cost. Additional costs may be saved by applying optimization techniques such as extent pruning described above.

An additional determination made during query compilation is the degree of parallelism possible for the query. Parallelism is an effective way to improve the performance of an SQL statement. During the parallel execution of the statement, every SQL operation in the execution plan is divided into work granules, each assigned to a different slave process (e.g., slave processes 112, 114, 132, 134). There are usually a lot more granules than the number of slaves in order to avoid skew. So granule and slave is generally not one-to-one mapping. Work granules are generally divided by data items in a table based on the granule distribution method chosen by the optimizer (e.g. hash, range, row-id range distribution). Data produced by a set of slave processes executing one operation are distributed to the set of processes executing the next operation in the plan. The number of processes assigned to a SQL operation is called the degree of parallelism (DOP). The DOP parallelism may be determined based on the number of slave processes available given system resources and the cost of performing the database operations that may be parallelized serially versus in-parallel.

Slave Process Locking

In an embodiment, once the DOP is determined, the slave processes are locked from use by other system resources until completion of query execution. In an embodiment, locking occurs at least for the entirety of the recursive branch (e.g., branch 464). In a preferred embodiment, the slave processes are locked for the duration of query execution (e.g., query 460). Without this technique, a query coordinator (e.g., query coordinator 110) could request a plurality of slave processes, and one or more slave processes could be acquired by another query coordinator (e.g., query coordinator 130) once it is released by the current query coordinator (e.g., query coordinator 110) if no locking step is implemented.

Additionally, by locking the slave processes, the data managed by each slave process in the CDTT is protected from being dumped for other tasks. Each slave process has been assigned to manage a respective segment of the CDTT, so losing a slave process would require re-assigning the segment managed by that slave process to a new slave process. Furthermore, the process of requesting a slave process and releasing a slave process has a particular computational cost. Using the locking technique, this cost is reduced from a multiple of the number of iterations to a single cost.

In-Parallel Execution of Recursive with Sub-Queries

A CDTT is generated by the plurality of slave processes. Each segment of the CDTT is managed by the respective slave process of the plurality of slave processes that have been assigned to execute the query. As a slave process produces a respective portion of a result set for a given iteration, that slave process appends said respective portion of the result set to the respective segment that the slave process manages. Thus, in-parallel result sets of the work granules are stored in a decentralized manner.

The initialization branch executes a single time to produce a first iteration result set. Executing the initialization branch may include loading data from an initial table (e.g. table 450) into one or more buffers (not shown) to be used during execution of subsequent stages. In the present example, the initialization branch for query 460, indicated by section 462, includes scanning table 450, selecting rows where the "fid" is less than "tid", and storing the results in a temporary table. This predicate constrains results to only "forward" relationships in affinity graph 400.

Executing a recursive branch includes one or more repeated operations. The repeated operations may end after a particular number of iterations or when a particular end condition is reached. The number of times execution of a recursive branch repeats may not be determined until execution of the recursive branch completes.

In example query 460, recursive branch 464 includes repeating the SELECT statement and storing the results for each iteration in the temporary table generated during execution of the initialization branch 462. At the end of an iteration, any exit conditions are checked by the query coordinator (e.g. query coordinator 110) to determine whether to execute another iteration or to proceed to executing the finalization branch. In the present example, recursive branch 464 repeats while r.tid=t.fid and t.fid<t.tid return at least one result. The first condition, r.tid=t.fid, is the "recursive portion" of the query that constrains results to user identifications that previously could have received a message. The second condition, t.fid<t.tid, constrains results to only forward relationships as shown in affinity graph 400.

Example of In-Parallel Execution Using On-Disk CDTT

Query execution is performed by a query coordinator (e.g. query coordinator 110) dividing the work required by a query into "work granules." The slave processes (e.g., slave processes 112, 114, 132, 134) then use the work granules as instructions to perform database operations against portions of the database.

Figure 5A:
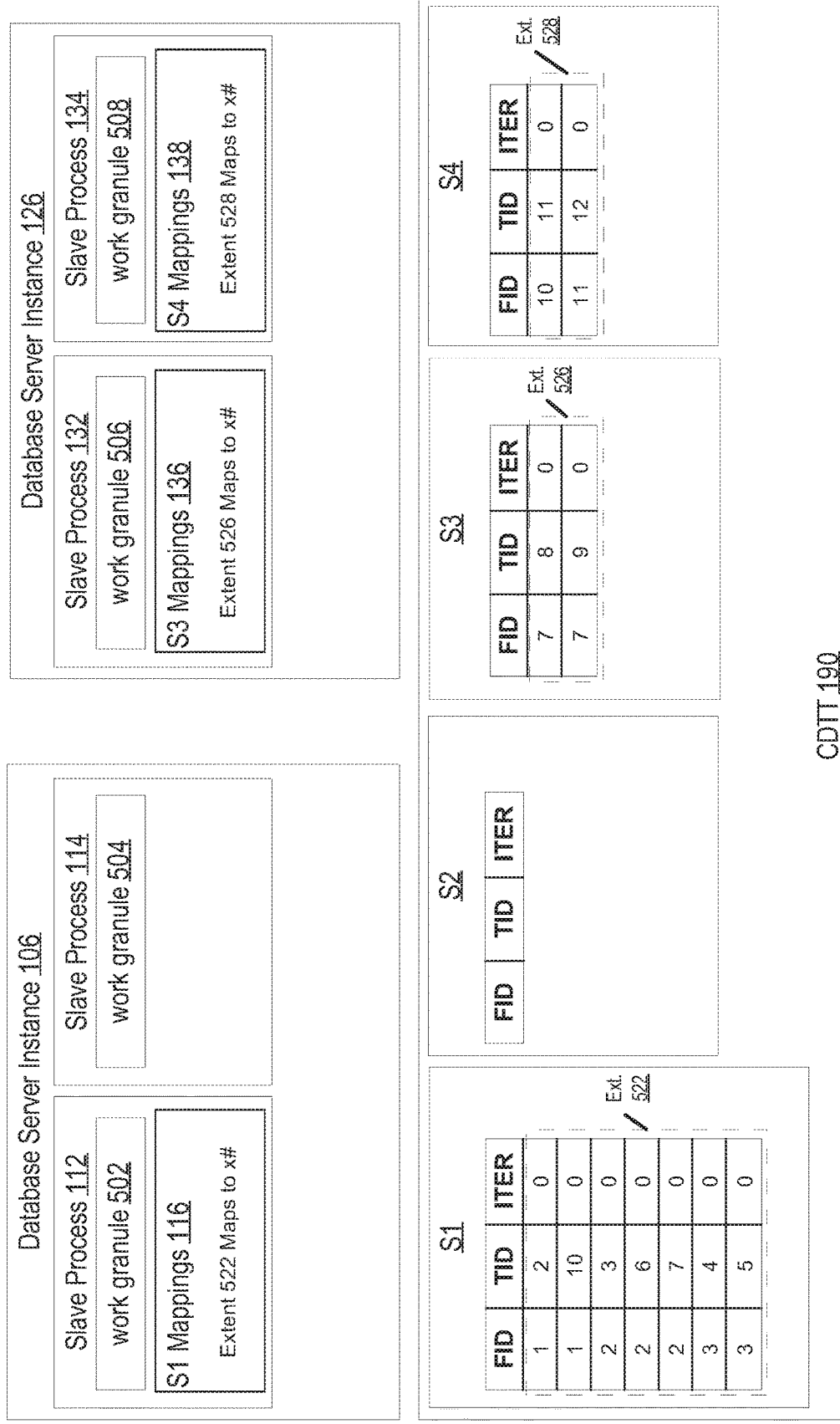
FIG. 5A is a block diagram illustrating a system state of the system architecture in FIG. 1A during execution of the initialization branch of the example query in FIG. 4C using an on-disk CDTT.

FIG. 5A is a block diagram illustrating a system state of the system architecture in FIG. 1A during execution of initialization branch 462 of example query 460 against table 450 using an on-disk CDTT 190. The system state during execution of the initialization branch 462 comprises work granules assigned to a plurality of slave processes. In this example,

- work granule 502 comprises performing database operations required by the initialization branch for "fid" data items 1-3 of table 450; work granule 502 is assigned to slave process 112
- work granule 504 comprises performing database operations required by the initialization branch for "fid" data items 4-6 of table 450; work granule 504 is assigned to slave process 114
- work granule 506 comprises performing database operations required by the initialization branch for "fid" data items 7-9 of table 450; work granule 506 is assigned to slave process 132
- work granule 508 comprises performing database operations required by the initialization branch for "fid" data items 10-12 of table 450; work granule 508 is assigned to slave process 134

During execution of the initialization branch 462, three extents (i.e., extents 522, 526, 528) are created by executing work granules 502-508.

Slave process 112 creates extent 522 in segment S1 and keeps S1 mappings 116 in local memory Slave process 132 creates extent 526 in segment S3 and keeps S3 mappings 136 in local memory Slave process 134 creates extent 528 in segment S4 and keeps S4 mappings 138 in local memory Each record of each extent 522, 526, 528 includes the iteration number 0. For clarity purposes the "path" column is not shown.

After each slave process produces a set of results for the first iteration, query coordinator 110 merges the results into a single segment S0 in a metadata operation. FIG. 5B is a block diagram illustrating a system state of the system architecture in FIG. 1A after execution of initialization branch 462 of example query 460 against table 450 using an on-disk CDTT 190. After query coordinator 110 merges and sends the information to the slave processes 112, 114, 132, 134 mappings reference extents that all belong to a single segment S0. Segment S0 is depicted as a single logical table to represent the intermediate result set of initialization branch 462.

After completion of the initialization branch, database management system 100 checks for an end condition. If the end condition is met, the recursive branch 464 is not executed and the query coordinator proceeds to execute the final branch. In this example, the end condition is having no results after completing the initialization branch. Because this condition is not met, database system 100 begins execution of the recursive branch 464.

Figure 5C:
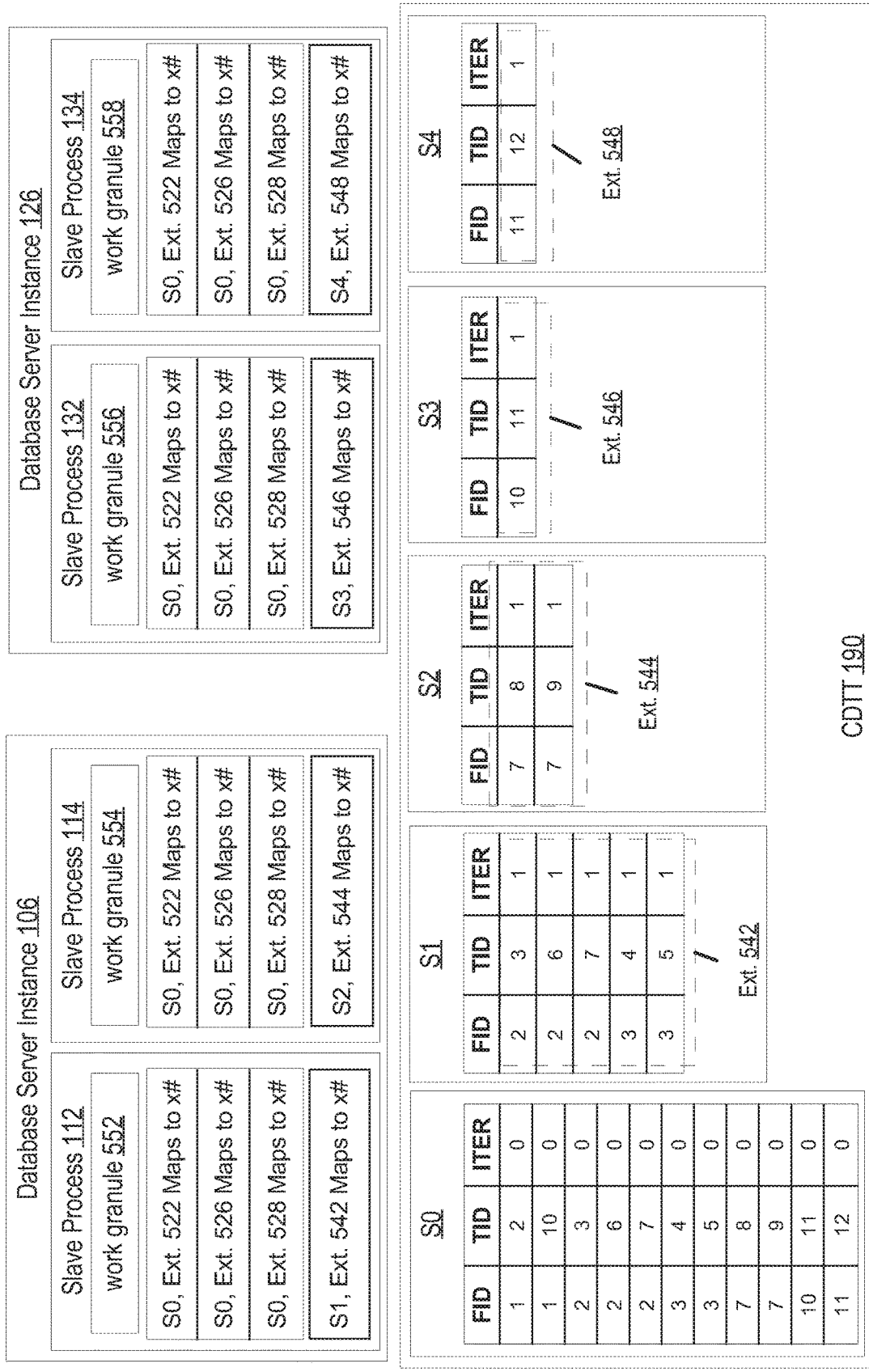
FIG. 5C is a block diagram illustrating a system state of the system architecture in FIG. 1A during execution of the recursive branch of the example query in FIG. 4C using an on-disk CDTT.

FIG. 5C is a block diagram illustrating a system state of the system architecture in FIG. 1A during execution of recursive branch 464 of example query 460 against table 450 using an on-disk CDTT 190. A process of a database server (e.g. query coordinator 110) divides the work required by the recursive branch 464 of query 460 into work granules 552, 554, 556, 558. The slave processes (e.g., slave processes 112, 114, 132, 134) then use the work granules as instructions to perform database operations against portions of the database and the intermediate results in CDTT 190 under S0.

The system state during execution of the recursive branch 464 comprises work granules assigned to a plurality of slave processes.

Work granule 552 comprises performing database operations required by the recursive branch 464 for "fid" data items 2-4 of table 450; work granule 532 is assigned to slave process 112

Work granule 554 comprises performing database operations required by the initialization branch 464 for "fid" data items 5-7 of table 450; work granule 534 is assigned to slave process 114

Work granule 556 comprises performing database operations required by the recursive branch 464 for "fid" data items 8-10 of table 450; work granule 536 is assigned to slave process 132

Work granule 558 comprises performing database operations required by the recursive branch 464 for "fid" data items 11-12 of table 450; work granule 538 is assigned to slave process 134

During execution of the recursive branch 464, four extents (i.e., extents 542, 544, 546, 548) are created after executing work granules 552-558.

Slave process 112 creates extent 542 in segment S1 and keeps S1 mappings 116 in local memory Slave process 114 creates extent 544 in segment S2 and keeps S2 mappings 118 in local memory Slave process 132 creates extent 546 in segment S3 and keeps S3 mappings 136 in local memory Slave process 134 creates extent 548 in segment S4 keeps S4 mappings 138 in local memory After each slave process produces a set of results for the second iteration, query coordinator 110 merges the results into a single segment S0 in a metadata operation. This would produce a system state similar to FIG. 5B but with more results in the depiction in S0 of CDTT 190. The process continues for as many iterations as necessary until reaching an end condition. In this particular case, the end condition is not receiving any result rows in a particular iteration.

Example of In-Parallel Execution Using In-Memory CDTT

In in-parallel execution using an in-memory CDTT, an in-memory CDTT is generated by the plurality of slave processes. Each segment of the CDTT is managed by the respective slave process of the plurality of slave processes that have been assigned to execute the query. As a slave process produces a respective portion of a result set for a given iteration, that slave process appends said respective portion of the result set to the respective segment that the slave process manages. Thus, in-parallel result sets of the work granules are stored in a decentralized manner.

Figure 6A:
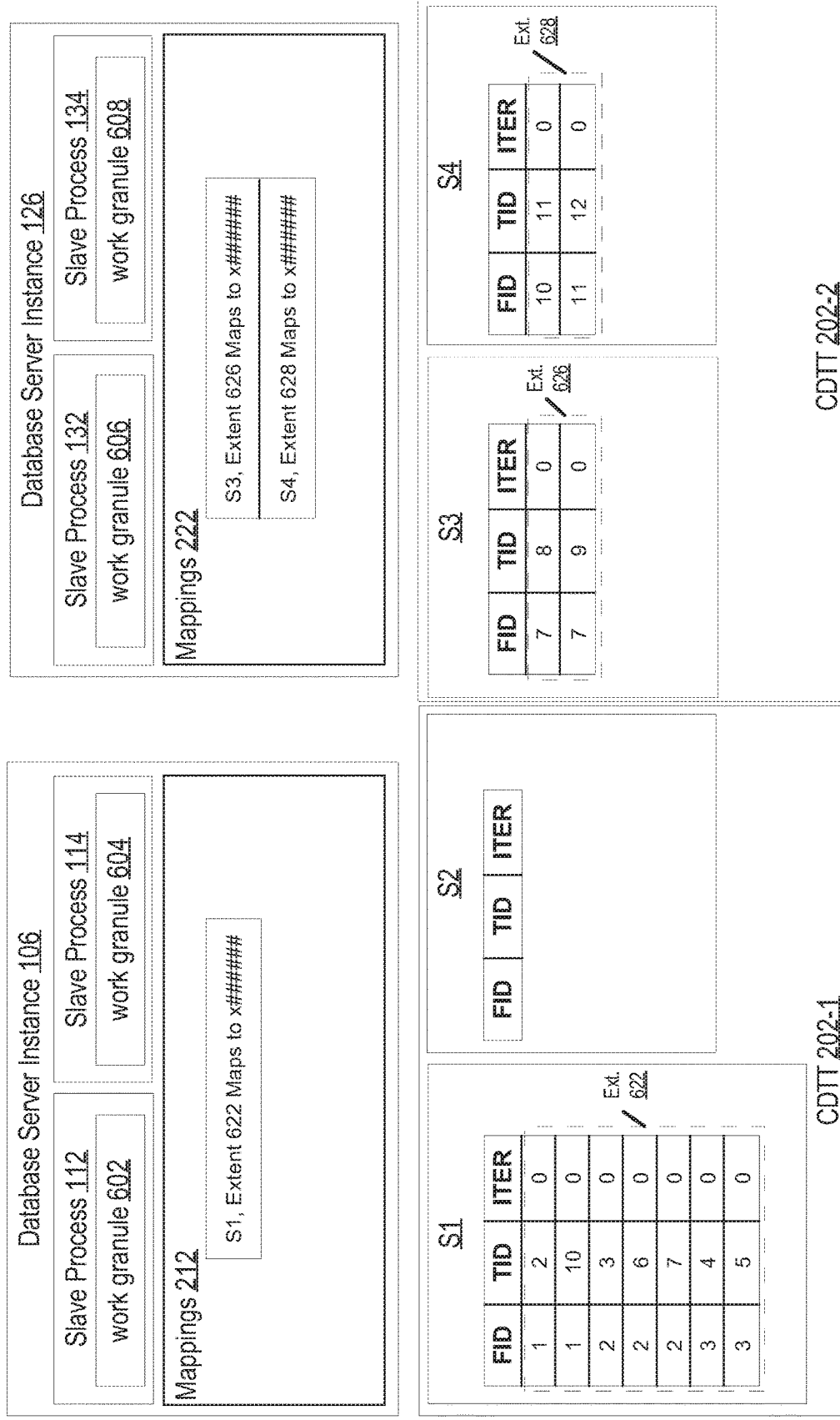
FIG. 6A is a block diagram illustrating a system state of a system architecture in FIG. 2 after completing a first iteration of the example query in FIG. 4C.

FIG. 6A is a block diagram illustrating a system state of the system architecture configured to execute, in-parallel, a query with a recursive clause after completing execution of initialization branch 462 of example query 460 against table 450. The system state after executing the initialization branch 462 comprises the work granules assigned to the plurality of slave processes. In this example, work granule 602 comprises performing database operations required by the initialization branch for "fid" data items 1-3 of table 450, which is assigned to slave process 112 work granule 604 comprises performing database operations required by the initialization branch for "fid" data items 4-6 of table 450, which is assigned to slave process 114 work granule 606 comprises performing database operations required by the initialization branch for "fid" data items 7-9 of table 350, which is assigned to slave process 132 work granule 608 comprises performing database operations required by the initialization branch for "fid" data items 10-12 of table 350, which is assigned to slave process 134

The system state after executing the initialization branch 462 also comprises segments S1, S2, S3, and S4 of CDTT 202 and the records contained therein. In this example, only three extents (i.e., extents 622, 626, 628) are created after executing work granules 602-608.

Slave process 112 creates extent 622 in segment S1 and publishes a reference to local mappings 212

Slave process 132 creates extent 626 in segment S3 and publishes a reference to local mappings 222

Slave process 134 creates extent 628 in segment S4 and publishes a reference to local mappings 222

Each record of each extent 622, 626, 628 includes the iteration number 0. For clarity purposes the "path" column is not shown. Additionally, for clarity purposes, the iteration tag associated with each respective extent is not shown. However, an iteration tag '0' could be associated with each extent 622, 626, 628 indicating the first iteration. This tag may be used for extent pruning in later iterations.

After completion of the initialization branch, database management system 100 checks for an end condition. If the end condition is met, the recursive branch 464 is not executed and the query coordinator proceeds to execute the final branch. In this example, the end condition is having no results after completing the initialization branch. Because this condition is not met, database system 100 begins execution of the recursive branch 464.

One or more processes of a database server (e.g., query coordinator 110 or the slave processes 112, 114, 132, 134 themselves) divide the work required by the recursive branch 464 of query 460 into work granules. The slave processes (e.g., slave processes 112, 114, 132, 134) then use the work granules as instructions to perform database operations against portions of the database and the intermediate results in CDTT 202. Because each slave process only has direct access to their local mappings and data (e.g., either mappings 212 or 222), the slave processes scan the data that is locally available and distribute the scanned data across the set of slave processes using a distribution algorithm. The slave processes that receive this data then perform the database operation required for that particular portion of the query.

For example, slave processes 112 and 114 may execute work granules that involve scanning extent 622 of segment S1 in CDTT 202-1. This may involve performing extent pruning. The data from segment S1 may then be distributed to one or more of slave processes 112, 114, 132, 134. Similarly, slave processes 132 and 134 may execute work granules that involve scanning extent 626 of segment S3 and extent 628 of segment S4 in CDTT 202-2. The data from these segments may then be distributed to one or more of slave processes 112, 114, 132, 134.

Figure 6B:
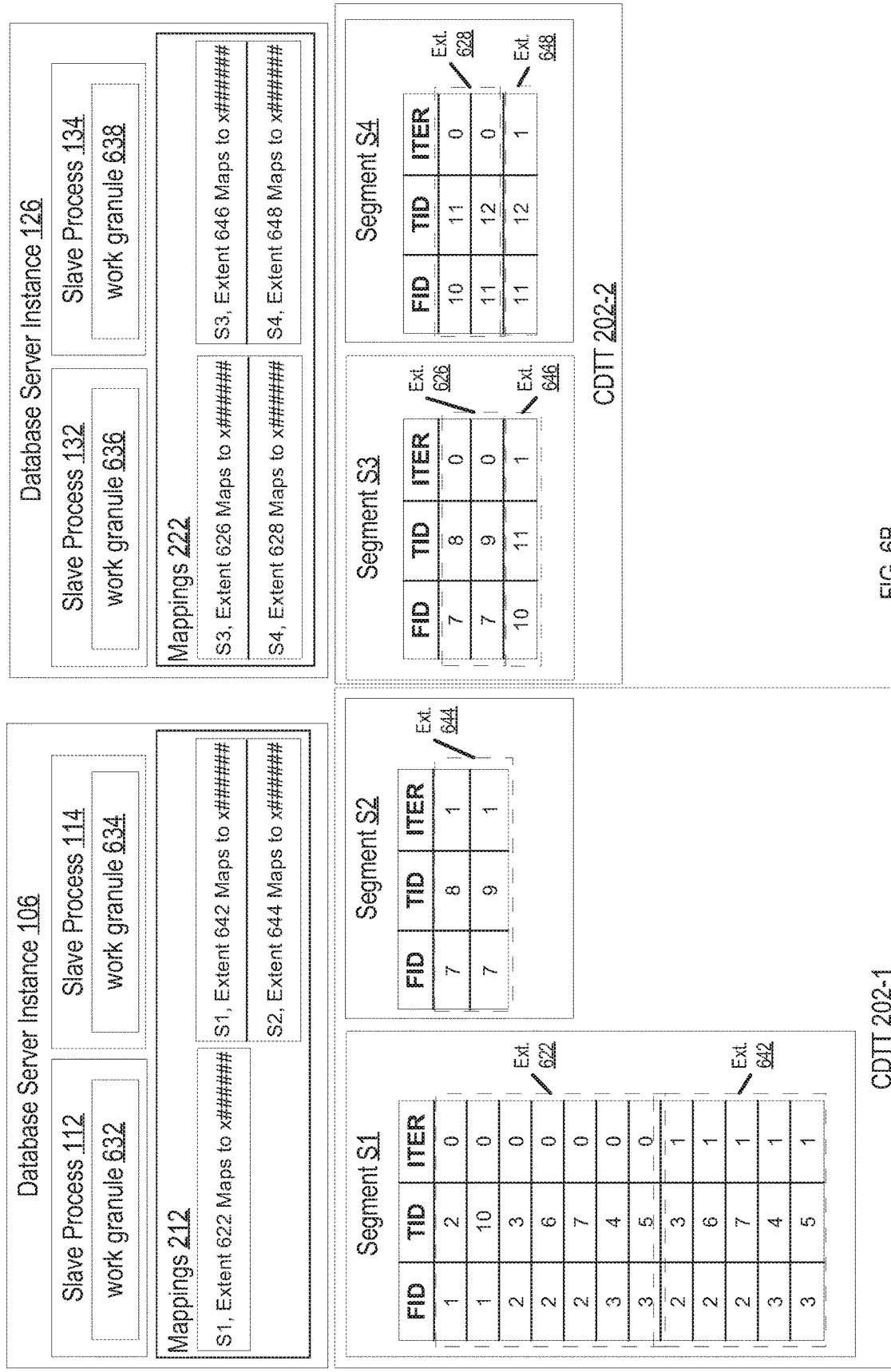
FIG. 6B is a block diagram illustrating a system state of a system architecture in FIG. 2 after completing a second iteration of the example query in FIG. 4C.

FIG. 6B is a block diagram illustrating a system state of the system architecture configured to execute, in-parallel, a query with a recursive clause after completing the second iteration in the WITH clause of example query 460. The system state 620 after executing the second iteration (first iteration of the recursive branch 464) comprises the work granules assigned to the plurality of slave processes and segments of the CDTT and the records contained therein. In this example, Work granule 632 comprises performing database operations required by the initialization branch for "fid" data items 2-4 of table 450, which were assigned to slave process 112

Work granule 634 comprises performing database operations required by the initialization branch for "fid" data items 5-7 of table 450, which were assigned to slave process 114

Work granule 636 comprises performing database operations required by the initialization branch for "fid" data items 8-10 of table 450, which were assigned to slave process 132

Work granule 638 comprises performing database operations required by the initialization branch for "fid" data items 11-12 of table 450, which were assigned to slave process 134

In this example, four extents (i.e., extents 642, 644, 646, 648) were created based on the respective work granules 632-638. Each slave process appends the respective extent that it generated to the respective segment that it manages. For example:

Slave process 112 appends extent 642 to segment S1 and publishes a reference to local mappings 212

Slave process 114 appends extent 644 to segment S2 and publishes a reference to local mappings 212

Slave process 132 appends extent 646 to segment S3 and publishes a reference to local mappings 222

Slave process 134 appends extent 648 to segment S4 and publishes a reference to local mappings 222

Each record of each extent 642-648 includes the iteration number 1 in the "iter" column. For clarity purposes the "path" column is not shown. Additionally, for clarity purposes, the iteration tag associated with each respective extent is not shown. However, an iteration tag '1' could be associated with each extent 642-648 indicating the second iteration.

Example of Spillover to Disk Using In-Memory CDTT

In some embodiments, CDTT 202 need not be entirely in one or more volatile memories. As previously explained, in some embodiments, the space allotted to a CDTT in volatile memory of each node (e.g., nodes 102, 122) may be limited, so the CDTT can "spill over" to disk. Thus, a CDTT may be partially in-memory of one or more nodes and partially on disk.

Figure 6C:
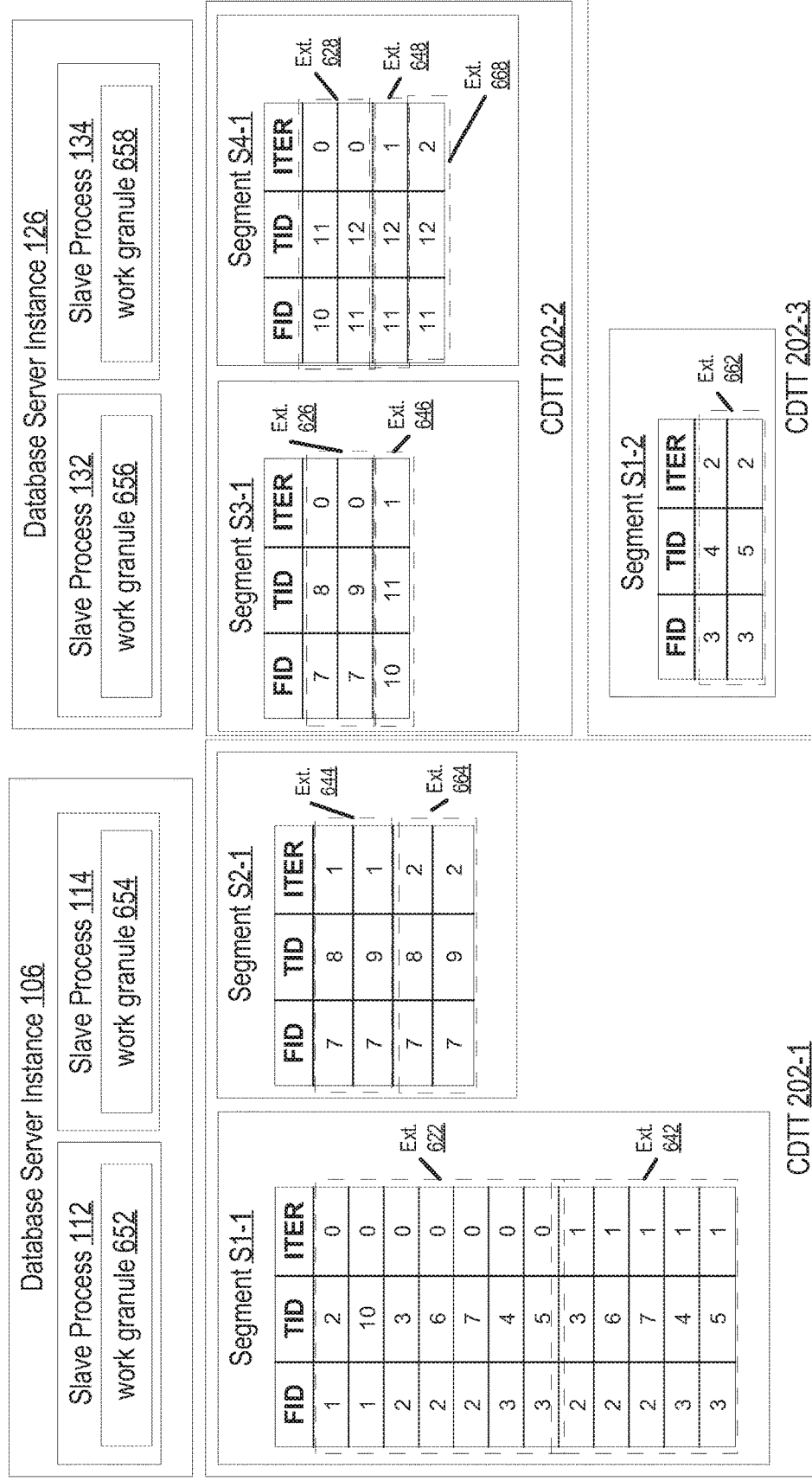
FIG. 6C is a block diagram illustrating a system state of a system architecture in FIG. 2 after completing a third iteration of the example query in FIG. 4C.

FIG. 6C is a block diagram illustrating a system state of a system architecture after completing a third iteration of the example query in FIG. 4C. In the present example, Extent 662 is stored on disk 160 similar to how CDTT 202-3 is presented in FIG. 2; local mappings 212 provide a reference to extent 662, so slave processes 112, 114 may access this data on disk 160

Extents 622, 642, 644, and 664 are stored in volatile memory of node 102 similar to how CDTT 202-1 is presented in FIG. 2; local mappings 212 provide a reference to these extents, so slave processes 112, 114 may access this data in SGA 210; and Extents 626, 646, 628, 648, and 668 are stored in volatile memory of node 122 similar to how CDTT 202-2 is presented in FIG. 2; local mappings 222 provide a reference to these extents, so slave processes 132, 134 may access this data in SGA 220;

Each respective slave process publishes a mapping to the location of the extents for the respective segment that the respective slave process manages. In each read of the CDTT, the slave processes access their local mappings to determine where to read the extents in the CDTT. Each slave process reads a respective set of data from the CDTT and sends the data that is reads to the respective slave process that is required to perform work on that data. Extent pruning may occur during this process.

In-Parallel Execution of the Final Branch

Execution of the finalization branch may include performing additional database operations on records stored in the temporary table and outputting a set of one or more results. In the present example, the executing finalization branch 466 includes selecting all rows of the temporary table by the "fid", "tid", "iters", and "path" columns and outputting the results.

FIG. 7 is an example table illustrating results of the example query 460 after completing execution of the finalization branch. Note the data items in the "path" column describe the path a message could take through affinity graph 400. A more advanced query could easily have been used to show the probability of a message travelling down said path by assigning the cost of each result record in the initialization branch as 1, and by multiplying the data item in the "cost" column for each additional iteration.

Although the present example is described using recursive WITH, the techniques described herein can be used with other recursive operations, such as frequent item sets and connect by, or by non-iterative operations that request results generated by other database operations.

Aging Out the Cursor and Releasing the Slave Processes

After the query has been processed, the slave processes may be released and the information defining the CDTT may be overwritten. The memory (either local or on-disk) may be de-allocated, so the free space is available for future queries. Depending on how the DBMS is structured the results of the finalization branch may be persisted as a table for future queries.

Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
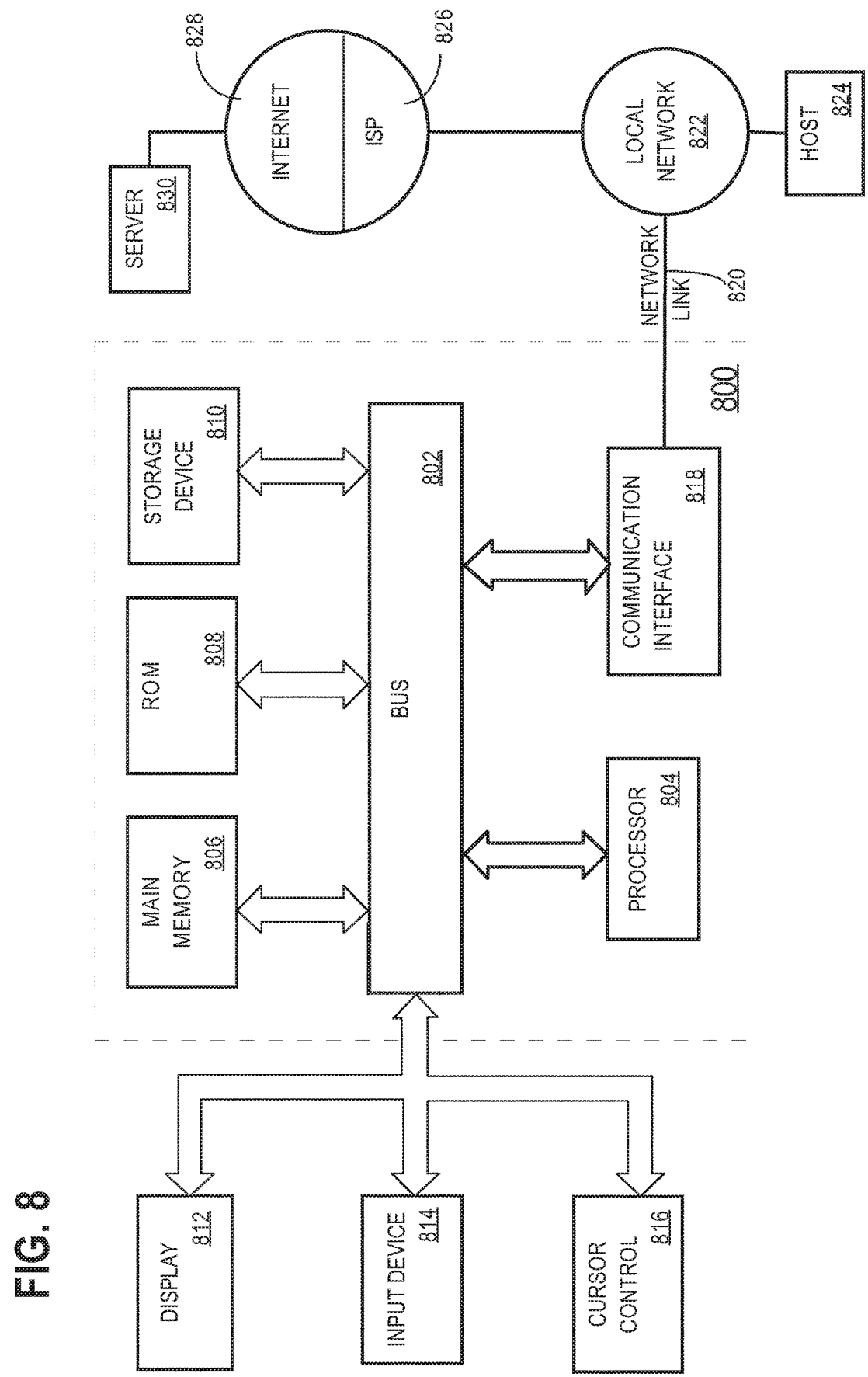
FIG. 8 is a block diagram illustrating a computer system that may be used to implement the techniques described herein.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a cathode ray tube (CRT), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   executing a query with a recursive clause wherein the executing includes:
   generating a temporary table for a first set of results, wherein the temporary table comprises a plurality of segments, each segment of said plurality of segments being associated with a respective process of a plurality of processes that execute database operations in parallel;
   indicating the first set of results are associated with a first iteration of the recursive clause; and
   for one or more additional iterations, each corresponding process of the plurality of processes performing in parallel with one or more other processes of the plurality processes:
      retrieving, from the temporary table, a set of results from a previous iteration based on an indication that associates the set of results with the previous iteration;
      performing one or more operations on the set of results from the previous iteration thereby generating a respective additional set of results;
      indicating the respective additional set of results is associated with a respective additional iteration;
      appending the respective additional set of results to a corresponding segment associated with said each corresponding process; and
      wherein said each corresponding process produced the respective additional set of results by performing, in parallel with the one or more other processes of the plurality processes, the one or more operations.

2. The method of claim 1, wherein the plurality of processes are executing on a plurality of database servers; the method further comprising:
   for a respective segment of the plurality of segments associated with the respective process of the plurality of processes,
   storing, in a volatile memory of a database server that is executing the respective process, at least a portion of the respective segment associated with the respective process;
   storing, in the volatile memory of the database server, one or more mappings to the respective segment.

3. The method of claim 1, wherein the plurality of processes are executing on a plurality of database servers operatively coupled to a shared storage; the method further comprising:
   for a respective segment of the plurality of segments associated with the respective process of the plurality of processes,
   storing, in the shared storage, the respective segment associated with the respective process;
   storing, in a volatile memory of the database server executing the respective process, one or more mappings to the respective segment; and
   merging, mappings of the plurality of segments, into a single particular segment associated with the temporary table.

4. The method of claim 1, further comprising performing, in parallel on the plurality of processes, a final set of one or more database operations against the temporary table generated based on the recursive clause of the query.

5. The method of claim 1, wherein each process of the plurality of processes is locked from performing other database operations for other queries until completing execution of at least the recursive clause of the query.

6. The method of claim 1, wherein the temporary table is internally defined and associated with a cursor; the method further comprising:
   deleting the temporary table when the cursor ages out.

7. The method of claim 1, further comprising:
   checking for an end condition for the recursive clause after each iteration; and
   if and only if the end condition is not found,
      creating work granules for a next iteration; and
      distributing the work granules to the plurality of processes to execute in parallel.

8. One or more non-transitory computer-readable media storing one or more sequences of instructions which, when executed by one or more processors, cause performing of:
   executing a query with a recursive clause wherein the executing includes:
   generating a temporary table for a first set of results, wherein the temporary table comprises a plurality of segments, each segment of said plurality of segments being associated with a respective process of a plurality of processes that execute database operations in parallel;
   indicating the first set of results are associated with a first iteration of the recursive clause; and
   for one or more additional iterations, each corresponding process of the plurality of processes performing in parallel with one or more other processes of the plurality processes:
      retrieving, from the temporary table, a set of results from a previous iteration based on an indication that associates the set of results with the previous iteration;
      performing one or more operations on the set of results from the previous iteration thereby generating a respective additional set of results;

indicating the respective additional set of results is associated with a respective additional iteration;

appending the respective additional set of results to a corresponding segment associated with said each corresponding process; and wherein said each corresponding process produced the respective additional set of results by performing, in parallel with the one or more other processes of the plurality processes, the one or more operations.

9. The one or more non-transitory computer-readable media of claim 8, wherein the plurality of processes are executing on a plurality of database servers; wherein the one or more non-transitory computer-readable media store instructions which, when executed by the one or more processors, further cause:

for a respective segment of the plurality of segments associated with the respective process of the plurality of processes, storing, in a volatile memory of a database server that is executing the respective process, at least a portion of the respective segment associated with the respective process;

storing, in the volatile memory of the database server, one or more mappings to the respective segment.

10. The one or more non-transitory computer-readable media of claim 8, wherein the plurality of processes are executing on a plurality of database servers operatively coupled to a shared storage; wherein the one or more non-transitory computer-readable media store instructions which, when executed by the one or more processors, further cause:

for a respective segment of the plurality of segments associated with the respective process of the plurality of processes, storing, in the shared storage, the respective segment associated with the respective process;

storing, in a volatile memory of the database server executing the respective process, one or more mappings to the respective segment; and merging, mappings of the plurality of segments, into a single particular segment associated with the temporary table.

11. The one or more non-transitory computer-readable media of claim 8, storing instructions which, when executed by the one or more processors, further cause: performing, in parallel on the plurality of processes, a final set of one or more database operations against the temporary table generated based on the recursive clause of the query.

12. The one or more non-transitory computer-readable media of claim 8, wherein each process of the plurality of processes is locked from performing other database operations for other queries until completing execution of at least the recursive clause of the query.

13. The one or more non-transitory computer-readable media of claim 8, wherein the temporary table is internally defined and associated with a cursor; wherein the one or more non-transitory computer-readable media, store instructions which, when executed by the one or more processors, further cause:

deleting the temporary table when the cursor ages out.

14. The one or more non-transitory computer-readable media of claim 8, storing instructions which, when executed by the one or more processors, further cause:

checking for an end condition for the recursive clause after each iteration; and if and only if the end condition is not found, creating work granules for a next iteration; and distributing the work granules to the plurality of processes to execute in parallel.

15. A database management system comprising one or more computing devices configured to:

executing a query with a recursive clause wherein the executing includes:

generate a temporary table for a first set of results, wherein the temporary table comprises a plurality of segments, each segment of said plurality of segments being associated with a respective process of a plurality of processes that execute database operations in parallel;

indicate the first set of results are associated with a first iteration of the recursive clause; and for one or more additional iterations, each corresponding process of the plurality of processes perform in parallel with one or more other processes of the plurality processes:

retrieving, from the temporary table, a set of results from a previous iteration based on an indication that associates the set of results with the previous iteration;

performing one or more operations on the set of results from the previous iteration thereby generating a respective additional set of results;

indicating the respective additional set of results is associated with a respective additional iteration;

appending the respective additional set of results to a corresponding segment associated with said each corresponding process; and wherein said each corresponding process produced the respective additional set of results by performing, in parallel with the one or more other processes of the plurality processes, the one or more operations.

16. The database management system of claim 15, wherein the one or more computer devices are a plurality of database servers, wherein the plurality of processes are executing on the plurality of database servers; wherein the one or more computing devices are further configured to:

for a respective segment of the plurality of segments associated with the respective process of the plurality of processes, store, in a volatile memory of a database server that is executing the respective process, at least a portion of the respective segment associated with the respective process;

store, in the volatile memory of the database server, one or more mappings to the respective segment.

17. The database management system of claim 15, wherein the one or more computing devices are a plurality of database servers, where in the plurality of processes are executing on the plurality of database servers operatively coupled to a shared storage; wherein the one or more computing devices are further configured to:

for a respective segment of the plurality of segments associated with the respective process of the plurality of processes, store, in the shared storage, the respective segment associated with the respective process;

store, in a volatile memory of the database server executing the respective process, one or more mappings to the respective segment; and merge, mappings of the plurality of segments, into a single particular segment associated with the temporary table.

18. The database management system of claim 15, wherein the one or more computing devices are further configured to: perform, in parallel on the plurality of processes, a final set of one or more database operations against the temporary table generated based on the recursive clause of the query.

19. The database management system of claim 15, wherein each process of the plurality of processes is locked from performing other database operations for other queries until completing execution of at least the recursive clause of the query.

20. The database management system of claim 15, wherein the one or more computing devices are further configured to:
   check for an end condition for the recursive clause after each iteration; and
   if and only if the end condition is not found,
      create work granules for a next iteration; and
      distribute the work granules to the plurality of processes to execute in parallel.

21. The method of claim 1, wherein retrieving, from the temporary table, the set of results from the previous iteration based on the indication that associates the set of results with the previous iteration, is performed by:
   each process of the plurality of processes:
      generating one or more work granules to perform scanning against a portion of the temporary table;
      performing said scanning against the portion of the temporary table defined by the one or more work granules; and
      based on the scanning, distributing, to the plurality of processes, the set of results from the previous iteration.

22. The one or more non-transitory computer-readable media of claim 8, storing instructions which, when executed by the one or more processors, further cause:
   each process of the plurality of processes:
      generating one or more work granules to perform scanning against a portion of the temporary table;
      performing said scanning against the portion of the temporary table defined by the one or more work granules; and
      based on the scanning, distributing, to the plurality of processes, the set of results from the previous iteration.

* * * * *